United States Patent [19]

Peters

[11] Patent Number: 6,097,727

[45] Date of Patent: Aug. 1, 2000

[54] METHODS, SYSTEMS AND COMPUTER PROGRAM PRODUCTS FOR END-TO-END ROUTE SELECTION IN COMPOUND WIDE/LOCAL AREA NETWORKS

[75] Inventor: Marcia Lambert Peters, Raleigh, N.C.

[73] Assignee: International Business Machines Corporation, Armonk, N.Y.

[21] Appl. No.: 08/841,212

[22] Filed: Apr. 29, 1997

[51] Int. Cl.[7] .................................................. H04L 12/28
[52] U.S. Cl. ............................................ 370/400; 370/238
[58] Field of Search .................................... 370/238, 252, 370/400, 389, 392, 393, 401, 402, 403, 404, 405, 406, 408, 409, 231, 235, 411, 437, 475; 395/238, 242, 243, 244

[56] References Cited

U.S. PATENT DOCUMENTS

| | | | |
|---|---|---|---|
| 4,873,517 | 10/1989 | Baratz et al. | 370/238 |
| 4,914,571 | 4/1990 | Baratz et al. | 364/242.94 |
| 4,995,035 | 2/1991 | Cole et al. | 370/254 |
| 5,021,949 | 6/1991 | Morten et al. | 364/200.61 |
| 5,175,733 | 12/1992 | Nugent | 370/400 |
| 5,222,242 | 6/1993 | Choi et al. | 395/200.57 |
| 5,233,604 | 8/1993 | Ahmadi et al. | 370/400 |
| 5,241,682 | 8/1993 | Bryant et al. | 395/200.79 |
| 5,491,690 | 2/1996 | Alfonsi et al. | 370/400 |
| 5,495,479 | 2/1996 | Galaand et al. | 370/400 |
| 5,596,719 | 1/1997 | Ramakrishnan et al. | 370/238 |
| 5,600,638 | 2/1997 | Bertin et al. | 370/400 |

OTHER PUBLICATIONS

*SNA APPN Architecture Reference*, Ch. 9, pp. 9–1–9–240 (Mar., 1993).

Boyle, et al., A Technical Overview: VTAM V4R2, NCP V6R3, V7R1, and V7R2, SSP V3R9, V4R1, and V4R2, *IBM United States Technical Bulletin*, GG66–3256–00, pp. 24–49 (Nov. 1994).

APPN Architecture and Product Implementations Tutorial, *IBM International Technical Support Bulletin*, GG24–3669–02, pp. 117–128 (Apr. 1994).

IBM AS/400 in Large Networks: A Case Study, *IBM International Technical Support Bulletin*, GG24–3447, pp. 18–29 (Nov. 1989).

*APPN Primer: A Guide to Advanced Peer–to–Peer Networking*, Systems Strategies/Aperatus Technologies (1994).

*SNA Internetworking: A Framework for Action*, A Supplement to Business Communications Review (Feb. 1994).

*Primary Examiner*—Ricky Ngo
*Attorney, Agent, or Firm*—Myers Bigel Sibley & Sajovec; Jeanine S. Ray-Yarletts

[57] ABSTRACT

A route selection system, method and computer program provides a complete end-to-end communications path between an origin node and a destination node in a relatively large communications network having a number of branch networks and at least one backbone network operationally connectable to the branch network. The origin node, the destination node, or both nodes, are located in branch networks and operationally connect to standard network nodes in the backbone network by way of a branch network node. The branch network nodes may be cascaded or in parallel. The branch network node modifies the communications path selected by the standard network node. The branch network node conceals the hop between the node in the branch and itself, identifies the direction of the hop as either an uplink or a downlink, identifies itself as the control point of the resource located in the corresponding node in the branch, and includes the concealed hop information in its own tail vectors which it adds to the route. In serving the origin node, the branch network node completes the route prior to sending the route to the origin node. In serving the destination end node, the branch network node completes the route during connection setup. Connection setup may take the form of either BIND or Route Setup.

40 Claims, 24 Drawing Sheets

COMPOUND WIDE AREA, LOCAL AREA NETWORK

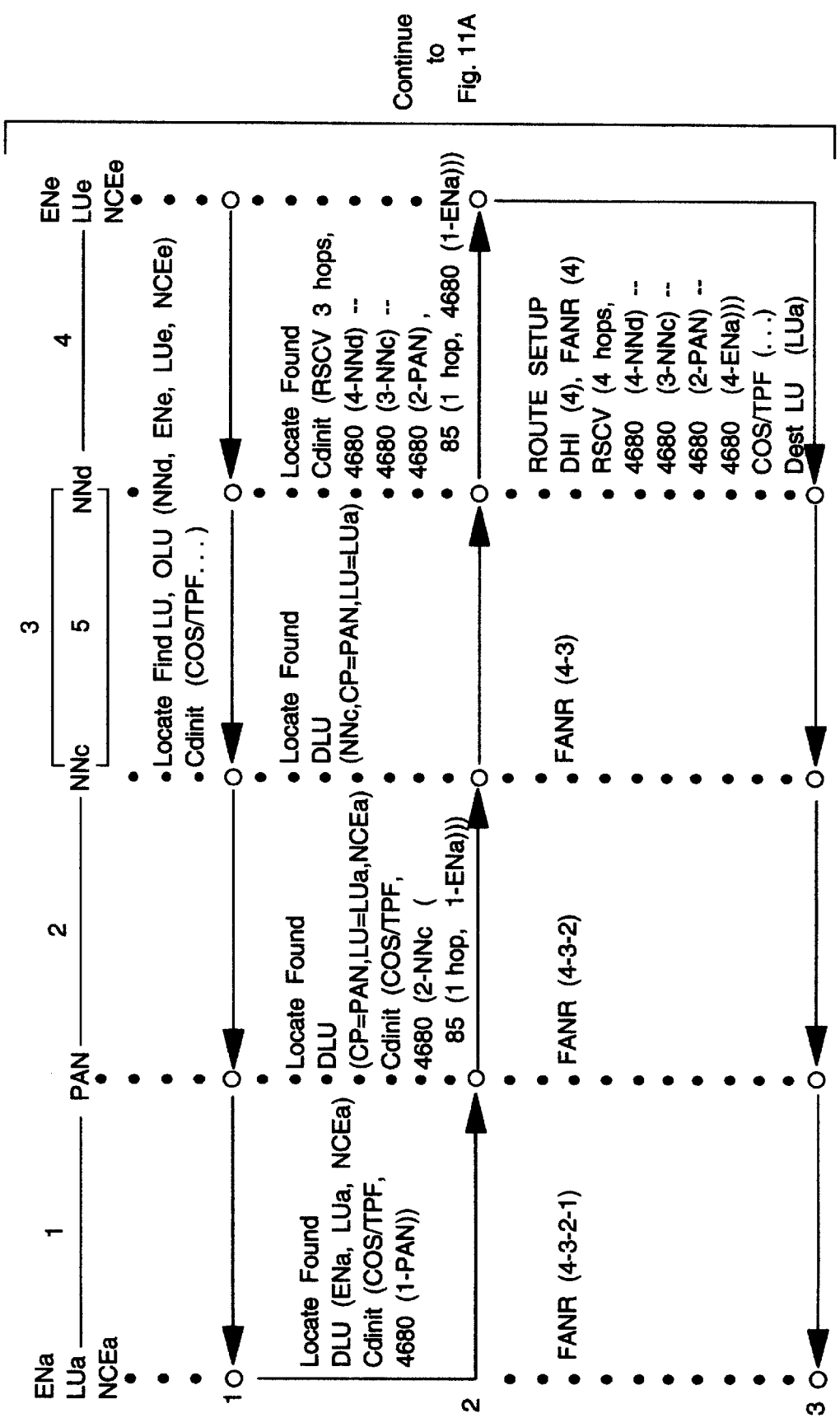

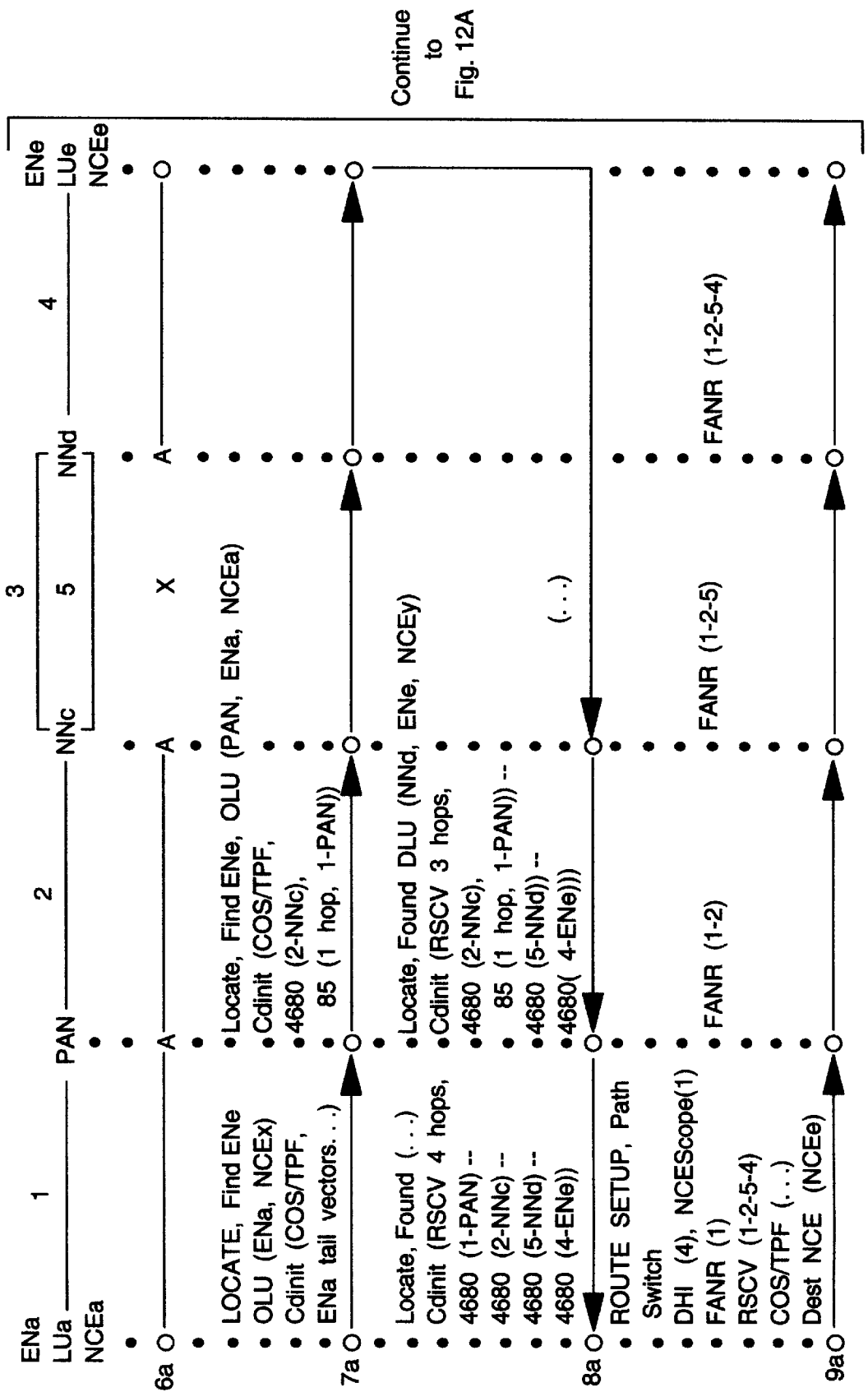

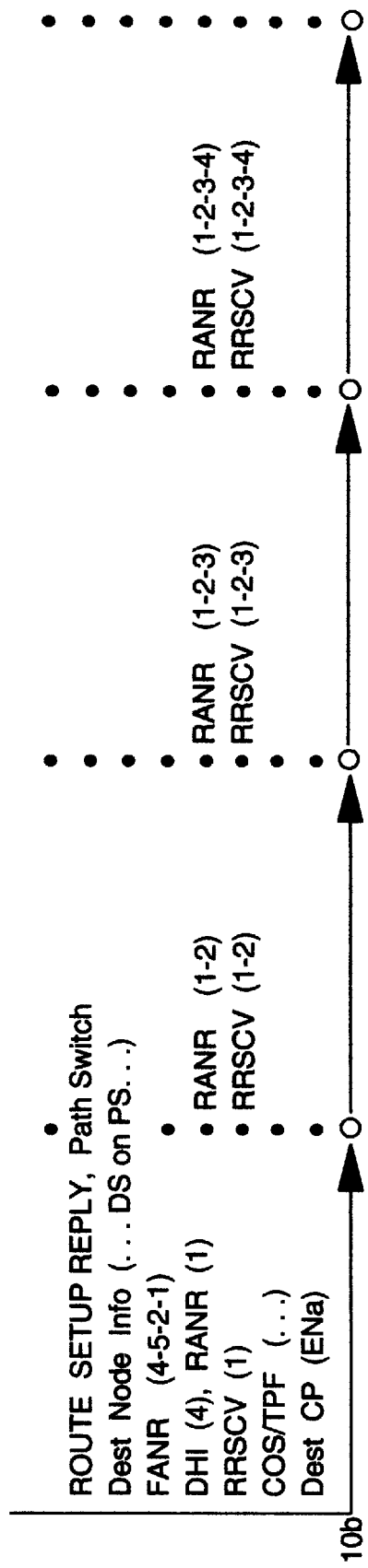

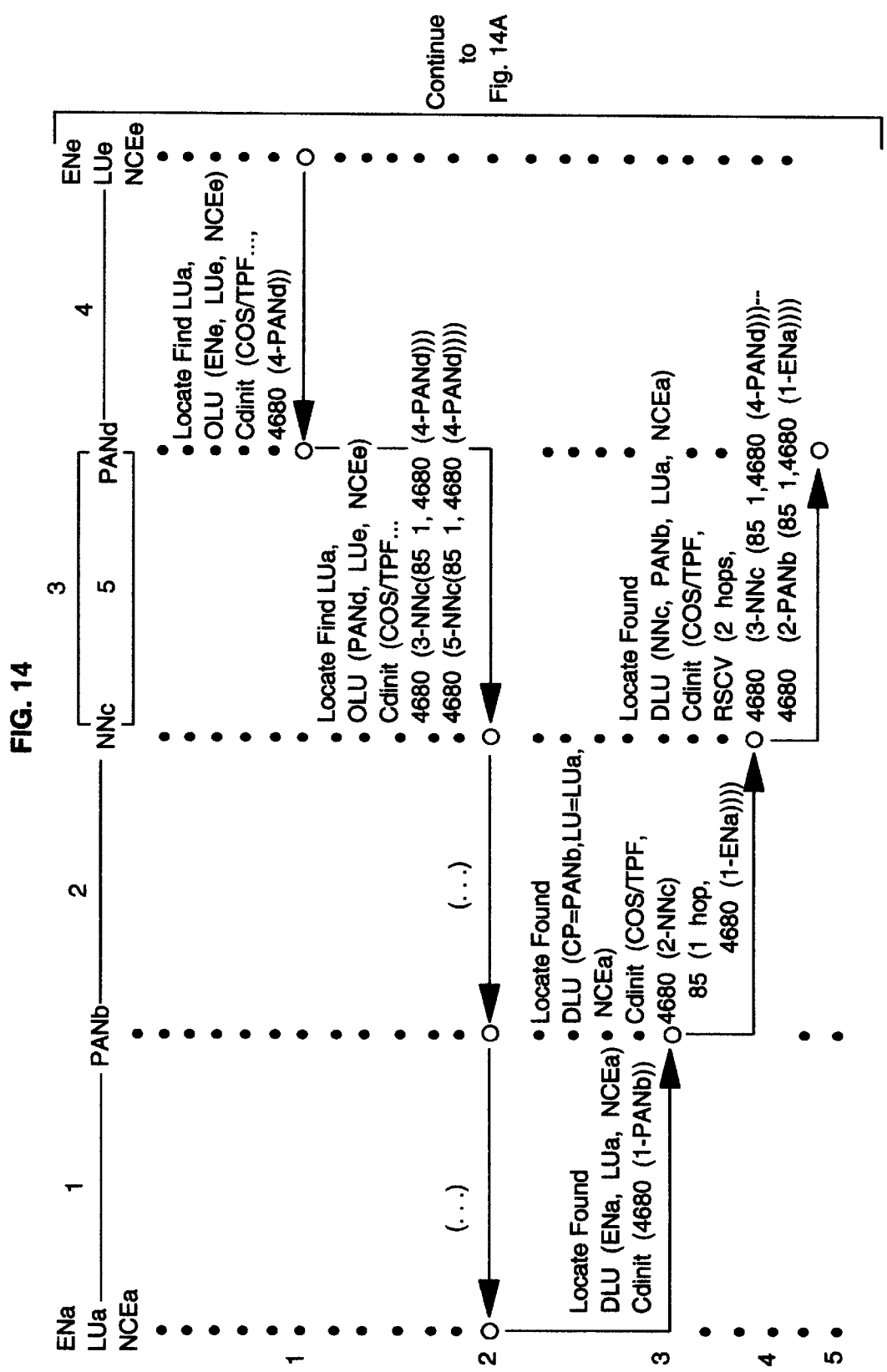

METHODS, SYSTEMS AND COMPUTER PROGRAM PRODUCTS FOR END-TO-END ROUTE SELECTION IN COMPOUND WIDE/LOCAL AREA NETWORKS

FIELD OF THE INVENTION

This invention relates to communications networks, and more particularly to end-to-end route selection in compound wide/local area networks.

BACKGROUND OF THE INVENTION

A communications network may be generally defined as a collection of computers or computing systems which interact and transmit data from one computer (i.e., node) on a network to another. The functional capabilities of the nodes may range from terminals with minimal local processing capability to complex multi-processors capable of high speed local processing. A node incorporates a set of control functions required to insure that network interfaces comply with networking standards or architectures. These control functions may be grouped into sets based on function. For example, each node may have a physical unit ("PU") which controls operation of real network resources such as links to other nodes, and a logical unit ("LU") which controls logical software-based entities such as applications.

The nodes may be interconnected to form local area networks ("LANs"). It has become a common practice to combine the various LANs owned by one or more organization or entity into a single network. Moreover, it has also become common to interconnect large numbers of local area networks owned by one or more organization or entity. One method for accomplishing this interconnection is the use of wide area networks ("WANs") to interconnect the large number of LANs. Advanced Peer-To-Peer Networking (APPN) is a higher-layer (i.e., at layers 3 and 4 of the OSI model) networking protocol that can be used to interconnect underlying LANs and WANs. APPN networks offer a powerful, flexible and easy-to-use networking solution for client/server and distributed applications. However, the use of APPN to connect LANs over the WAN or "backbone" network may cause various problems. Exemplary problems relate to the interconnection of the WAN to the various LANs, and the implementation of the network topology database reflecting the combined network.

Overview: Typical WAN/LAN Network

Referring to FIG. 1, a conventional compound WAN/LAN network comprising four network nodes 11 is illustrated. Network nodes 11 each have a unique resource identifier, i.e., B.1, B.2, B.3 and B.4, respectively. This resource identifier is referred to as a control point name which has a prefix part referred to as a network identifier ("NETID"). All of the network nodes 11 of WAN 10 have the same NETID "B" (e.g., B.1 in network 10).

Network nodes 11 are interconnected by five interconnecting transmission links labeled L1, L2, L3, L4 and L5, respectively. Network nodes 11 and transmission links L1–L5 are merely illustrative of the numerous nodes and links that might form part of a real network 10. Indeed, network 10 can easily be transcontinental or even intercontinental and involve hundreds or even thousands of nodes and links.

Each communication link may be a permanent connection or a selectively enabled (dial up) connection, or any other kind of transmission facility, even including a portion of a LAN or a virtual LAN. Network nodes 11 each comprise a data processing system which provides data communication services to all connected nodes, network nodes and end nodes. The network nodes 11 each include one or more decision points within the node, at which point incoming data streams are selectively routed on one or more of the outgoing communication links, i.e., either to an end node attached to and/or served by that network node, or to another network node.

The network nodes 11 can each, in turn, be used to attach or interconnect users, even foreign network users, to the network 10. These types of interconnections can be made directly. For example, end nodes EN 5, EN 6 and EN 7 may be connected directly to network node (NN) B.3, or interconnected by way of additional network nodes or border nodes. Network node (NN) B.2, for example, is connected through network node NN 189 to a LAN having a ring architecture Ring LAN 13, and subsequently to end nodes, EN 1–EN 4. Network node B.4 is connected through network node NN 191 to Ring LAN 14 which in turn connects end nodes EN 11–EN 13. In addition, end nodes EN 8–EN 10 are connected to network node (NN) B.4 through network node NN 192. LANs such as the LANs illustrated in FIG. 1 are sometimes referred to as branch networks. For example, the LAN comprising nodes NN 191, EN 11, EN 12, and EN 13. and Ring LAN 14 may be referred to as a branch network.

End nodes 12 are exemplary of the hundreds or thousands of different end nodes which may be used to connect user resources to the wide area network 10. Such resources include Logical Units (LUs), applications programs, point-of-sale terminals, computers, printers, facsimile machines, file servers, mobile computers, pagers, network computers, and any other resource that might be used to provide network computing services. It should also be understood that any such resources might reside on either end nodes or network nodes. When the distinction between end node and network node is unimportant, such nodes may also be referred to as connection endpoint nodes to highlight their function in hosting such user resources.

Network node NN 191 may serve as a border node (BN). A border node (e.g., network node NN 191) may appear as an end node to nodes in other networks to which the border node is connected and may appear to be a network node to other nodes in its own network. However, a border node is a network node with enhanced function. Border nodes are more fully described in U.S. Pat. No. 5,241,682 entitled "Border Node Having Routing and Functional Capability in a First Network and Only Local Address Capability in a Second Network," and assigned to International Business Machines Corporation ("IBM"), the assignee of the present invention. U.S. Pat. No. 5,241,682 is incorporated herein by reference.

Still referring to FIG. 1, a communications path or route through the network from an origin node (i.e., a first node) to a destination node (i.e., a second node) is established in order to transmit data across the WAN/LAN network. Establishment of a route comprises both the selection of the route and connection of the nodes on the route. Thus, once a route has been selected, a connection request message is initiated from the origin node to the destination node in order to specifically identify and connect each node along the communications path. Once a connection has been made along this communications path, data may be transmitted along the connected path from the origin node to the destination node. Functions for establishing a path from a first node (i.e., origin node or origin endpoint node) to a second node (i.e., destination node or destination endpoint node) are known.

Overview: APPN Networks

APPN networks use a replicated topology database to assist in route selection. The network topology database provides information regarding the current connectivity between the network nodes within an APPN network. The database generally includes entries for all network nodes and for the transmission groups interconnecting each network node, and entries for transmission groups to all virtual routing nodes to which network nodes are attached. The network topology database is replicated at each standard network node and is dynamically maintained. Whenever a network resource is introduced or the characteristics of an existing resource change, updated information may be generated and propagated to all network nodes. The database is used by the network node route selection services to determine the preferred session route between two nodes for a given class of service.

The size of the replicated network topology database in an APPN network generally grows approximately linearly with the sum of the number of network nodes in the network and the number of links interconnecting the network nodes. As a result, the size of an individual APPN network may be limited by the network node having the smallest memory size. Several solutions have been proposed for addressing the constraint on network size imposed by the network node having the smallest memory.

Possible Solutions to Network Size Constraint

One possible solution is the peripheral border node, which is present in the AS/400 computer available from IBM, the assignee of the present invention. The peripheral border node provides topology isolation, allows session establishment between adjacent networks, and may require that the networks interconnected using the peripheral border node have distinct (i.e., different) NETIDs. Topology isolation refers to excluding information for the topology of the branch network (e.g., LAN) from the replicated topology database in the APPN WAN network such that the branch network appears to be a single end node. As a result, the peripheral border node provides topology hiding between the interconnected networks. This topology hiding is relatively expensive in terms of computer program codes and storage requirements. Moreover, a customer may need to interconnect networks which are not necessarily "adjacent" to one another, or to interconnect two networks having the same NETID.

Another existing solution is the extended border node ("EBN"). An example of an extended border node is implemented in the Virtual Telecommunications Access Method ("VTAM") Version 4.2 also available from IBM, the assignee of the present invention. VTAM Version 4.2 provides the attachment for applications programs and a host processor to a network implementing the Systems Network Architecture ("SNA") developed by IBM. The EBN also provides topology isolation and allows session establishment across multiple subnetworks. In addition, the EBNs allow a combination of subnetworks having the same or different NETIDs. Still further, the EBN allows complex routes traversing any number of intermediate subnetworks to be selected. It has user exits for policy routing, authentication, accounting and other installation-defined controls. However, these numerous functions may be expensive in terms of computer program code and storage requirements, and also may increase the complexity of interconnecting branch networks to an APPN network. Moreover, EBNs which are available through VTAM Version 4.2 are only available in mainframe software.

Another system which addresses route establishment is available from Microsoft Corporation, namely, the Microsoft NT SNA Server. The Microsoft NT SNA Server is based on a client/server split stack. Downstream nodes (i.e., nodes in a branch network) are connected to server nodes using a TCP/IP base client/server split stack, and receive services from the server node. As a result, the downstream nodes are not APPN end nodes. Moreover, the Microsoft NT SNA server may serve a large number of downstream nodes without being an APPN standard network node. Consequently, APPN topology size may not be an issue when connecting branches to the WAN in this manner. However, the Microsoft NT SNA server does not provide a complete APPN solution, in that network management cannot be performed down to the nodes in the branch from a single network management location, routes cannot be selected based on class of service, and prioritization cannot be applied to the routing of data packets.

Finally, a high performance routing ("HPR") border node provides functions similar to those provided by the extended border node (EBN). For example, the HPR border node provides topology hiding, similar to the EBN. In addition to the functions provided by the EBN, the HPR border node also supports automatic network routing ("ANR") between endpoints in different topology subnetworks and provides the entire string of ANR labels to the nodes being interconnected. Still further, topology isolation is not compromised. However, the ANR labels only are significant locally (i.e., in the local node), have a variable length, and do not contain node names, also known as control point ("CP") names (i.e., the names of the specialized logical units (LUs) comprising the set of network control applications in an APPN node). Moreover, the HPR border node does not support cross-subnet resource registration. The HPR border node contains all the same functions as an EBN plus the added function of cross-subnet ANR routing. As a result, the HPR border node has the same cost drawbacks as an EBN.

Another solution to improve the performance in a combined WAN/LAN network has been proposed relating to improved centralized directory services for a branch network environment. The enhanced directory service, which was proposed by IBM, allows route selection by standard network nodes regardless of the size or complexity of the WAN/LAN network. This enhanced directory services is described more fully in U.S. patent application Ser. No. 08/731,718, entitled "Enhanced Directory Services in Compound Wide/Local Area Networks" by J. Fletcher, M. Peters and J. Shin filed on Oct. 17, 1996 and assigned to IBM, the assignee of the present invention.

In addition to the shortcomings noted above with respect to these proposed solutions, an additional problem may arise. While a standard network node may compute a route, the standard network node has no knowledge of the connectivity between a border node and the nodes which reside within the branch network. This branch network topology is concealed from the standard network node, since the standard network node uses the border node as an end node. As a result of believing that the border node is an end node, the standard network node believes that all resources in the branch network reside on the border node. Consequently, routes selected by a standard network node either begin or end at the border node for the branch network. However, the route may need to extend beyond the border node to a connection endpoint node in the border node's domain (i.e., to an end node in the branch network). A solution to the problem of proper route selection is to let the border node forward the data to the proper node in the branch network.

This solution, however, may entail excessive overhead. Moreover, this solution will not support High Performance Routing (HPR) since HPR data flows will fail unless the Rapid Transport Protocol ("RTP") endpoint originating the connection has the full and correct route before initiating the connection set up (i.e., before connecting the two RTP endpoint nodes).

The problem caused by route selection in a network having a concealed network topology can best be described with respect to route selection in an APPN network. During route selection, the tail vectors provided by the standard APPN directory service protocols represent the connectivity of a border node in a branch network to a standard network node in the WAN network. The last hop from the border node to the actual connection endpoint node served by the border node is missing. The tail vector cannot be changed to point to a different node (i.e., from the border node to the connection endpoint node), as changing of the tail vector may confuse the base APPN nodes. If the path is permitted to terminate at the border node, all routes to nodes in the branch network will stop at the border node, and consequently, be incorrect. Moreover, prior to an HPR node sending a route setup request, a complete end-to-end route must have been selected (i.e., the route selection control vector must be complete). Otherwise, the route selection control vector (RSCV) will be incomplete, and RTP connections cannot be established.

Moreover, it is not possible to solve this problem by having a border node modify the RSCV on the route setup. While this might establish the initial route correctly, a subsequent path switch attempt will fail. This is because the RTP endpoint initiating path switch gets the endpoint information from the original (i.e., unmodified) RSCV. Thus, the RTP endpoint will not be able to determine a correct route for the path switch. The border node cannot fix the RSCV for the path switch because the new path might not even traverse that border node.

SUMMARY OF THE INVENTION

It is, therefore, an object of the present invention to provide methods, systems and computer program products for establishing a communications path between two nodes located in separate branch networks and between a node in a branch network and a standard node in a WAN.

It is another object of the present invention to provide methods, systems and computer program products for establishing a complete end-to-end communications path between two nodes located in separate branch networks, notwithstanding topology isolation and concealment.

It is another object of the present invention to provide methods, systems and computer program products for establishing a communications path between two nodes, at least one of which is in a branch network, to provide complete end-to-end, nondisruptive re-routing without adversely affecting the routing algorithms ordinarily implemented in an APPN network.

These and other objects are provided according to the present invention by methods, systems and computer program products for improving the establishment of an end-to-end communications path in a relatively large communications network having multiple branch networks and at least one backbone network by establishing a route between a first node (i.e., origin node) and a second node (i.e., destination node) wherein the route is calculated by a standard network node that does not have knowledge of the location of either the first node or the second node, or both the first node and the second node. The first node may be referred to as an origin node. The second node may be referred to as a destination node. Both the first node and the second node may be referred to as connection endpoint nodes. The invention is described in an environment in which the backbone network is an APPN network; however, the invention is not restricted to any specific type of branch network or APPN network.

A communications path having multiple nodes between a first node and a second node in a relatively large communications network may be established according to the present invention. The branch networks operationally connect to the backbone network, which has at least one standard network node. The first node (i.e., origin node) and the second node (i.e., destination node) are located in branch networks. In addition, either the first node, the second node, or both the first node and the second node are located in a branch network that is topologically hidden from the WAN.

In a preferred embodiment, methods according to the present invention select a route between the origin node and the destination node. The route which is selected may include at least one standard network node, and is selected by a standard network node without having knowledge of either the actual origin node (if that node is in a branch network), the destination node (if that node is in a branch network), or both the origin and destination nodes (if both nodes are in branch networks). The route selected by the standard network node is then modified by a new type of network node known as a branch network node, that adds the route between the branch network node and the connection endpoint node in the branch to the route selected by the standard network node. The links between the branch network node and the node in the branch were concealed from the standard network node due to topology isolation. As a result, a full and correct end-to-end route between the origin node and the destination node is selected.

Selection of the route according to the present invention includes first locating the destination node and then selecting a route between the origin node and the located destination node. More particularly, the route selection by the standard network node is enabled by relaying the location requests and replies from the branch network to the backbone network. In addition, the present invention modifies the tail vectors that it provides to standard network nodes, and modifies the route selection control vector. Tail vectors are modified by first computing a one-hop route from the branch network node to the appropriate node in the branch network, and encoding the missing one-hop route into the branch network node's tail vectors, such that the missing one-hop route data can be retrieved later by any branch network node or RTP endpoint but is not understood, noticed or even retrievable by standard network nodes in the backbone network. Tail vectors can be modified on behalf of both origin and destination nodes in branch networks. As such, the present invention enables route selection when either connection endpoint node is in a branch network or both connection endpoint nodes are in branch networks and are connected to branch network nodes by way of one or more of the branch network node's downlinks.

Once the origin node receives the route selection control vector from a branch network node, the origin node can then initiate connection setup. The connection setup includes session BIND, and in addition may include HPR Route Setup.

In an alternative embodiment, a communications path between an origin node and a destination node is established.

Establishment of the end-to-end communications path begins with the receipt of a request at a branch network node in the first branch network from the origin node to establish a communications path with the destination node. The branch network node then computes a one-hop route to the origin node, and modifies its own tail vectors to include this one-hop route. The modified tail vectors are transmitted along with the request to establish a communications path to a standard network node. In response to the transmission of the request containing the modified tail vectors for a communications path to the destination node, the branch network node receives a selected route in the form of a route selection control vector from the standard network node. The selected route identifies a communications path between the branch network node and the destination node and was selected by the standard network node without knowledge of the origin node. The first branch network node then modifies the selected route received from the standard network node to include the downlink between the first branch network node and the origin node and transmits the expanded selected route to the origin node.

As a result, an end-to-end communications path may be established between the origin node and the destination node by the standard network node, even though the standard network node has no knowledge of the origin node, due to the concealment of the hop between the first branch network node and the origin node inside the branch network node's own tail vectors. Similarly, an end-to-end communications path may be established between two nodes when the standard network node selecting the route has no knowledge of the destination node due to the concealment of the hop between a branch network node and the destination node.

Still further, the branch network nodes can be cascaded such that either connection endpoint node is more than one level down in the branch networks. In addition, the branch network nodes may be deployed in parallel.

BRIEF DESCRIPTION OF THE DRAWINGS

FIG. 11–11A is a control flow diagram illustrating the RTP Connection Setup operations according to the present invention in the environment in which the origin node is not in a branch network and the destination node is in a branch network;

FIG. 12–12A is a control flow diagram illustrating the operations of the present invention for a path switch initiated by a node in a branch network to a destination node that is not in a branch network after RTP Connection Setup has been completed in accordance with FIG. 10;

FIG. 13–13A is a control flow diagram illustrating the operations of the present invention for a path switch initiated by a node that is not in a branch network after RTP connection setup has been completed in accordance with FIG. 10;

FIG. 14–14A is a control flow diagram illustrating the operations of RTP Connection Setup according to the present invention when both connection endpoint nodes are in branch networks;

DESCRIPTION OF THE PREFERRED EMBODIMENT

Figure 1:
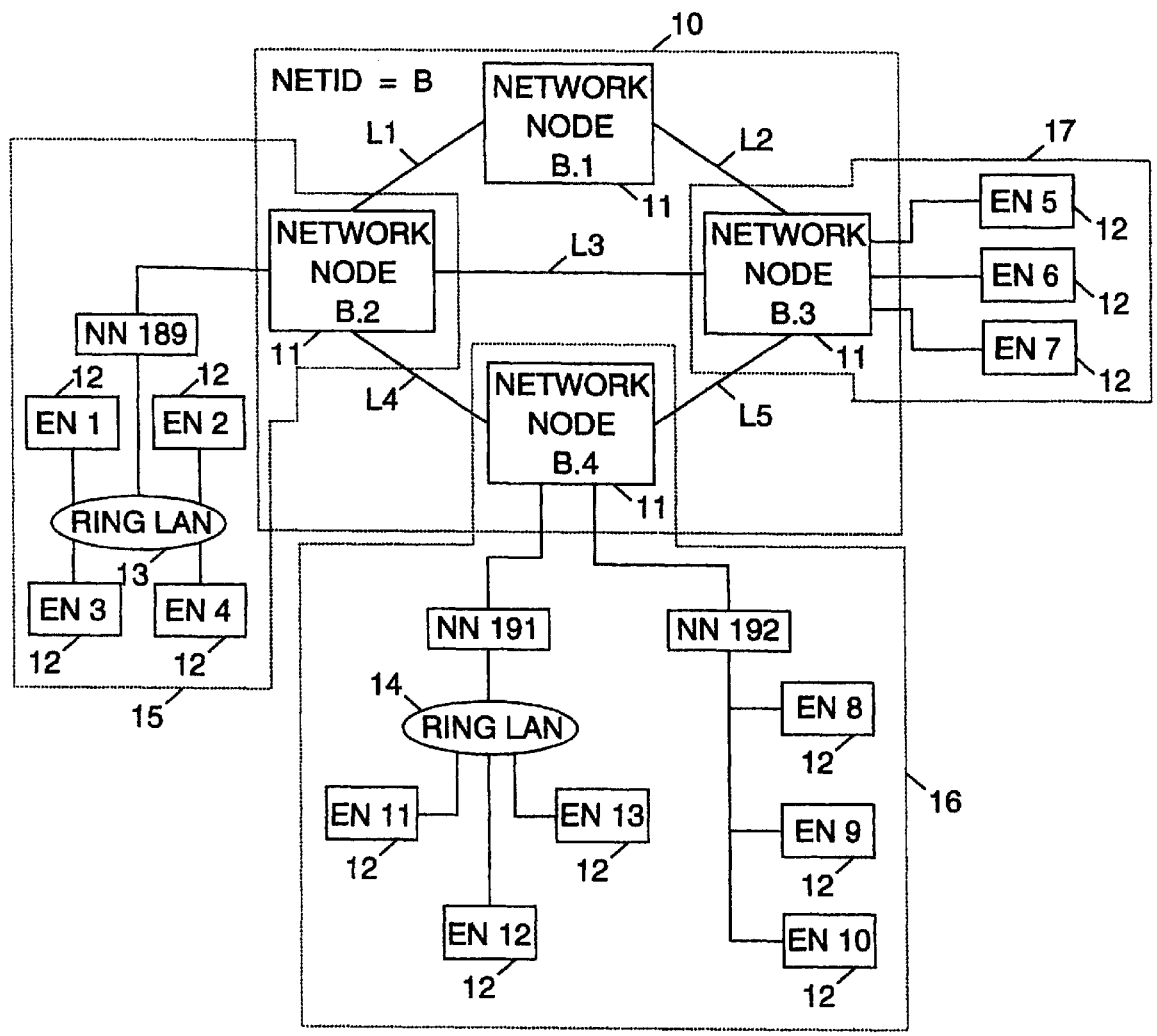
FIG. 1 is a block diagram illustrating a single combined local area network/wide area network containing network nodes and other standard APPN nodes.

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview

The present invention overcomes the problems of incomplete route establishment and hidden network topologies (i.e., concealment of nodes in branch networks) by modifying a network node. The modified network node of the present invention may be referred to as a branch network node ("BrNN") or a peripheral access node ("PAN"). A branch network node appears as a network node to end nodes in the same branch network which are attached to the branch network node over its "downlinks." In addition, the branch network node appears as an endpoint connection node to standard network nodes which are attached to the branch network node over its "uplinks." The branch network node relays Locate Find, Locate Found, BIND, Route Setup, and Multiple Domain Support (MDS) messages to and from end nodes attached to its downlinks. The branch network node also modifies the tail vectors that are provided to standard network nodes, and modifies the route selection control vector ("RSCV") provided by standard network nodes. Tail vectors are modified by the branch network node by first computing a one-hop route from the branch network node to the appropriate end node, taking into account the direction of the Locate Find (i.e., whether the corresponding endpoint connection node is the origin or the destination), and encoding the missing one-hop route into its own tail vectors. As a result, the concealed one-hop route data can be retrieved later by any branch network node, but is not noticed by standard network nodes. The branch network nodes according to the present invention can modify the tail vectors on behalf of both origin and destination nodes in its branch network.

During processing of a Locate Find operation initiated by an origin node in a branch network to a destination node not in a branch network, the branch network node modifies the resource hierarchy of the endpoint node and substitutes its own tail vectors. In particular, the branch network node computes a one-hop route from the origin node (i.e., the originating LU's control point) to itself using the class of service/transmission priority field ("COS/TPF"). The branch network node then embeds the computed one-hop route into its own tail vectors in a particular subfield (i.e., subfield X '85'.) Standard nodes in the backbone network will forward this subfield even though they do not understand its contents. Moreover, the branch network node does not need to store the tail vectors of the origin node or the one-hop route from the origin node to itself. Rather, the branch network node will receive the one-hop route to itself from the end node embedded as part of the first hop in the RSCV which it will receive from the standard network node.

The branch network node receives a Locate Found (i.e., positive Locate reply) with a corresponding RSCV. However, the RSCV received by the branch network node is incomplete, in that it lacks the first hop between the origin node and itself (i.e., "the branch network node's downlink"). The branch node inserts the aforementioned concealed embedded one-hop route as the first hop into the RSCV. Thereafter, the branch network node sends the completed RSCV to the origin node, and, as a result, the RSCV is complete and correct when the origin node initiates a connection setup request.

In some cases where the RSCV returned by the standard network node is a one-hop route, when a branch network node receives a Locate Found with a corresponding RSCV, the branch network node does special processing because an unexpected subfield X'85' is present, an expected subfield X'85' is missing, or the subfield X'85' is incomplete or represents another branch network node's downlink.

The present invention also enables an origin node not in a branch network to locate a destination node which is in a branch network. During operation of the Locate function, and in particular, during the Locate Found operation, the branch network node at the destination modifies the resource hierarchy of the destination node and substitutes its own tail vectors for those of the endpoint node. The branch network node computes a one-hop route from itself to the destination node using the COS/TPF and embeds the one-hop route within its own tail vectors using subfield X'85'. The branch network node at the destination does not need to store the actual tail vectors of the destination node or remember the one-hop route from itself on the downlink to the destination node. Rather, the branch network node will receive this information as part of the RSCV.

The branch network node need not complete the RSCV before the origin node uses the RSCV to initiate the connection setup. Rather, the RSCV will be fixed during connection setup. Upon receiving a "BIND," the branch network node uses the subfield X'85' embedded in the last hop of the RSCV to fix the RSCV before forwarding the BIND to the destination end node. A Route Setup into the branch network node's domain will have a correct RSCV as a result of the standard High Performance Routing ("HPR") logic done by the Rapid Transport Protocol ("RTP") connection initiator.

When a data stream flow calls for tail vectors, the branch network node sends its own tail vectors, and not the tail vectors of the connection endpoint node in the branch. As a result, this function complies with the branch network node reporting to the standard network node that the branch network node owns the resources of the end node control point in that branch network (EN CP) (i.e., is consistent with the branch network node appearing as an end node to the standard network node). The branch network node inserts a composite route selection subvector, namely, CV X'4685', into each tail vector it provides. This enables the RSCV representing the selected route to be corrected at a later time. For example, on a Locate Request from an origin node in a branch, the direction of the one-hop route designated by the composite route selection subvector CV X'4685' is from that origin node to the branch network node. The subfield X'85' is a part of control vector X'46', and thus, may also be referred to as "CV X'4685'." The branch network node makes this the first hop of CV X'4685'. If no CV X'4685' is present, the branch network node creates one. Otherwise, if a CV X'4685' is already present (as would be the case if branch network nodes are cascaded), the branch network node inserts this hop before all other hops. All hops in the CV X'4685' will later be used to form the prefix part of the corrected RSCV.

When a branch network node receives a Locate reply from a destination node in a branch, the branch network node computes a one-hop route between itself and the destination node, and the direction of the one-hop route is from the branch network node to that destination node. If no CV X'4685' is present, the branch network node creates a CV X'4685' including this one-hop route as the only hop of the subvector CV X'4685'. If a CV X'4685' is already present, the branch network node inserts this hop before all other hops. As a result, all hops in the CV X'4685' will later be used to form a suffix part of the corrected RSCV.

When creating a subvector CV X'85', the branch network node sets the maximum hop count in CV X'85' to 1. If the subvector CV X'85' is present, the branch network node increments its maximum hop count. It uses the COS/TPF control vector X'2C' in the one-hop route selection, if it is present. Otherwise, the branch network node derives a COS/TPF from the mode name present in control vector X'2D'. Using this COS/TPF, it computes a one-hop route in the appropriate direction.

FIGS. 2–14 and 16–18 are control flow diagrams illustrating the methods, systems, and program products according to the present invention. It will be understood that each flow or step of the control flow diagrams, and combinations of the flows or steps in the diagrams, can be implemented by computer program instructions. These computer program instructions may be loaded onto a computer or other programmable data processing apparatus to produce a machine such that the instructions that execute on the computer or other programmable apparatus create means for implementing the functions specified in the control flow diagram flow(s) or step(s). These computer program instructions may also be stored in a computer-readable memory that can direct a computer or other programmable apparatus to function in a particular manner, such that the instructions stored in the computer readable memory produce an article of manufacture including instruction means that implement the functions specified in the control flow diagram flow(s) or step(s). The computer program instructions may also be loaded onto a computer or other programmable apparatus to cause a series of operational steps to be performed on the computer or other programmable apparatus to produce a computer-implemented process such that the instructions that execute on the computer or other programmable apparatus provide flows or steps for implementing the functions specified in the control flow diagram flow(s) or step(s).

Accordingly, flows or steps of the control flow diagram illustrations support combinations of means for performing the specified functions, combinations of steps for performing the specified functions, and program instruction means for performing the specified function. It will also be understood that each flow or step of the control flow diagram illustrations, and combinations of flows or steps in the control flow diagram illustrations, can be implemented by special-purpose hardware-based computer systems that perform the specified functions or steps, or combinations of special-purpose hardware and computer instructions.

Figure 2A:
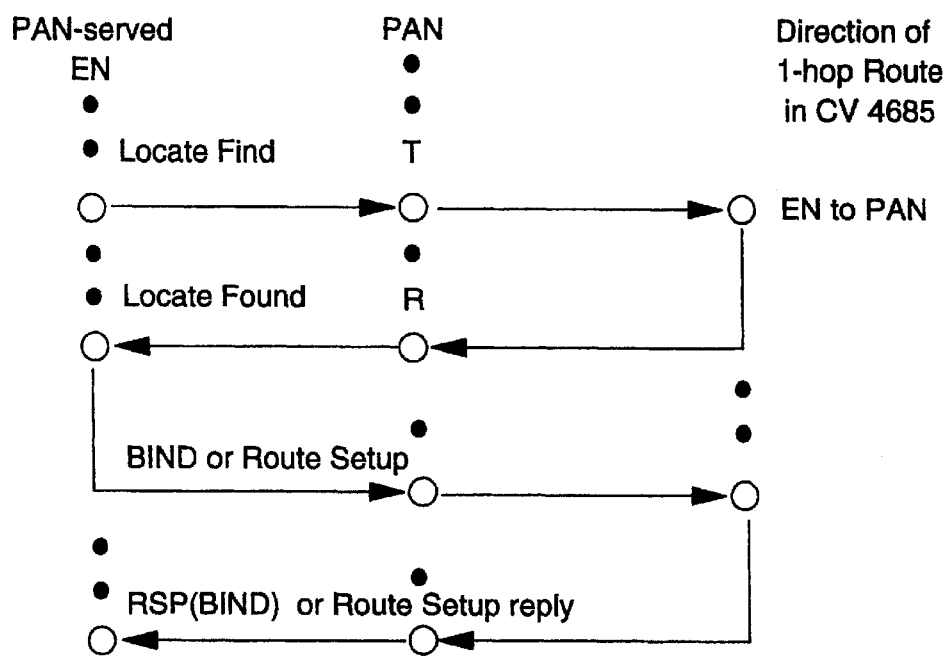
FIGS. 2A–2C are control flow diagrams illustrating the route establishment through the modification of tail vectors and completion of the route selection control vector (RSCV) according to the present invention.
Figure 2B:
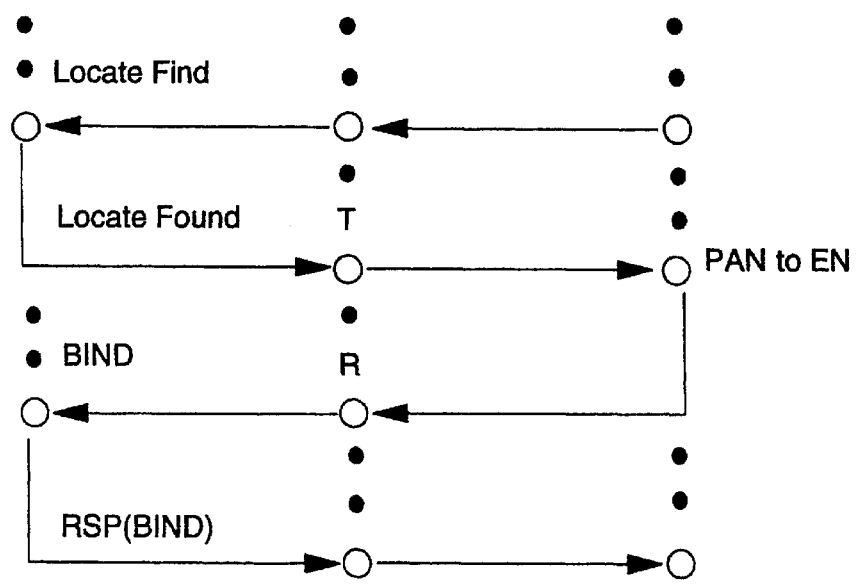
Figure 2C:
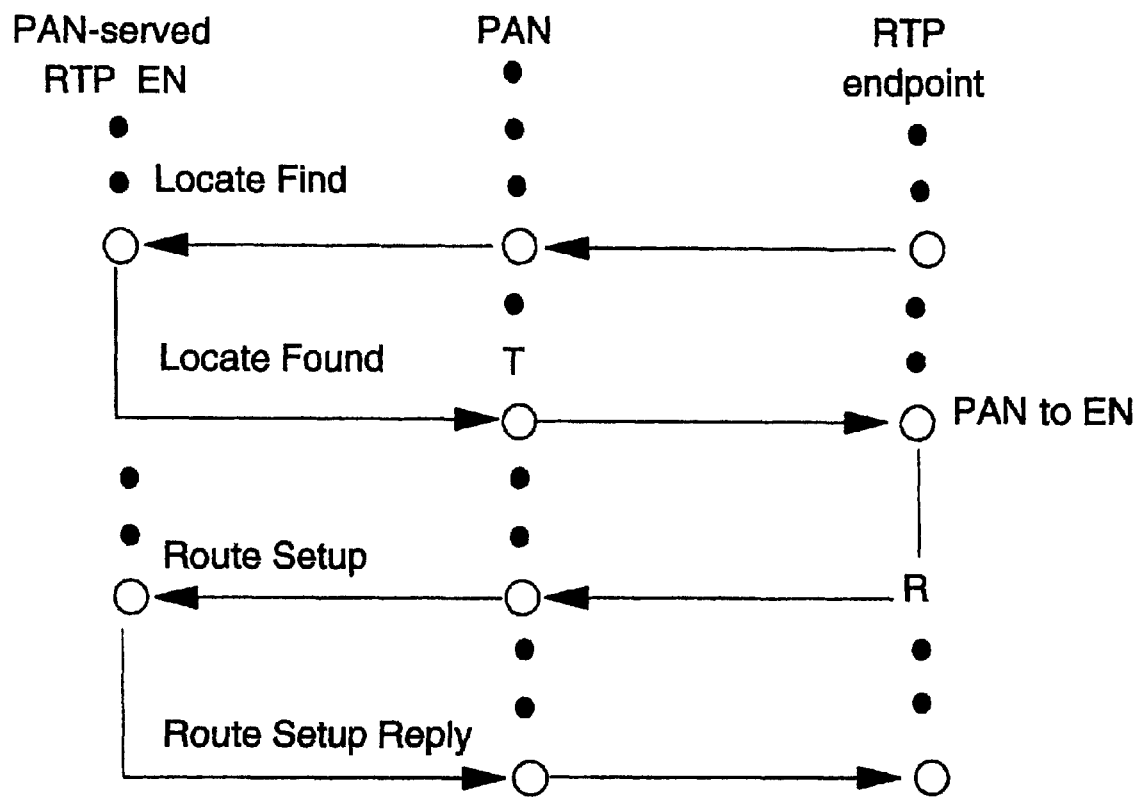

Referring to FIGS. 2A–2C, high level control flow diagrams illustrating the branch network node ("BrNN") tail vector and RSCV processing for three different sets of circumstances will now be described. The branch network node is identified in FIGS. 2–14 as "PAN". However, it may also be referred to as "BrNN." The "T" in FIGS. 2A–2C refers to tail vectors modified by the PAN. The "R" in FIGS. 2A–2C refers to an RSCV containing a subfield CV X'4685' which has been changed into a complete, normal end-to-end RSCV.

In particular, in FIG. 2A, the control flow diagram illustrates the operation of the branch network (PAN) and the tail vector and RSCV processing when the branch network node serves an origin node in a branch. In this instance, the PAN conceals the one hop from the origin node to itself inside the PAN's own tail vectors as indicated by "T." The PAN's standard network node server uses these tail vectors to compute a route to the destination node. When the PAN, which appears to the standard network node to be the origin node, receives the Locate Found and an RSCV from the standard network node, the PAN uses the concealed data to change the incomplete RSCV into a complete RSCV as indicated by "R." The PAN then relays the completed RSCV to the origin node in the branch.

Referring to FIG. 2B, a control flow diagram illustrates the operation of a branch network node (PAN) during service of a destination node in a branch before and after the origin node sends a BIND request. The PAN at the destination conceals the hop from itself to the destination node inside the PAN's own destination tail vectors. The standard network node serving the origin node uses the tail vectors of the PAN at the destination to compute a route. Thereafter, the origin node appends the RSCV to its BIND request, specifying the path that the BIND request is to take. The PAN at the destination intercepts the BIND request, uses the concealed data representing the one-hop downlink from itself to the destination node to change the incomplete RSCV to a complete RSCV, and relays the BIND and the completed RSCV to the destination note.

Referring to FIG. 2C, a control flow diagram illustrating the operation of a branch network node (PAN) during service of a destination node in a branch when an origin node sends a Route Setup request will now be described. In these circumstances, according to the present invention, the PAN at the destination conceals the one hop from itself to the destination node inside the PAN's own destination tail vectors during the Locate Found processing. Thereafter, the standard network node serving the origin node uses the modified tail vectors to compute a route to the PAN at the destination, believing it to be the destination of the connection. The origin node which is a Rapid Transport Protocol (RTP) endpoint receives the incomplete computed route in the form of an incomplete RSCV from the standard network node serving the origin node, and decodes the hop that was concealed in the RSCV by the destination PAN. The origin RTP endpoint node corrects the RSCV using the concealed data, and sends the Route Setup request using the corrected RSCV.

Detailed Operation: Locate Operation for Non-high Performance Routine Flows

Figure 3:
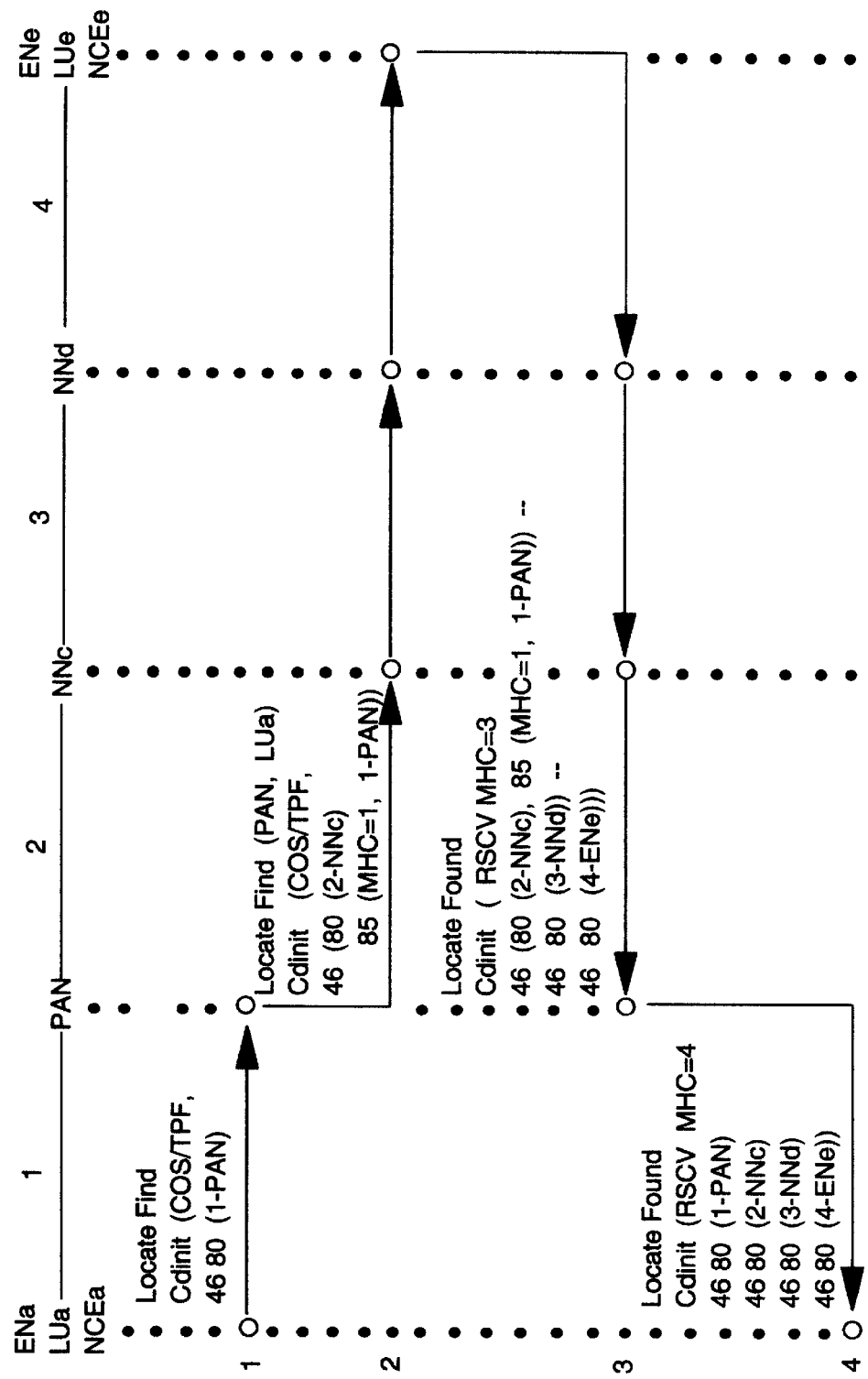
FIG. 3 is a control flow diagram illustrating the operations according to the present invention for the Locate Find and Locate Found functions when the origin node is attached to a branch network node and the destination node is not in a branch network.

Referring to FIGS. 3–6, control flow diagrams illustrating operations of the present invention during the Locate function for non-High Performance Routing ("non-HPR") flows will now be described. FIG. 3 illustrates the operations of the present invention relating to tail vector and RSCV manipulations for non-HPR flows when the origin node is in a branch network and the destination node is not in a branch network. In this example, at Step 1, the origin node (ENa) sends a Locate Find request to its branch network node (PAN) searching for a particular destination logical unit (LUe). The origin node (ENa) sends its tail vector (TG 1) with its Locate Find request to its branch network node (PAN). Upon receiving the Locate Find request from the origin node (ENa), the branch network node (PAN) at Step 2 modifies the resource hierarchy and substitutes its own tail vector(s) for ENa's tail vector(s). The branch network node (PAN) calculates a one-hop route in the ENa-PAN direction using the COS/TPF and appends the calculated one-hop route to its tail vectors in subfield CV X'85'. At Step 3, the standard network node (NNc) receives the Locate Found, and computes a route from the apparent origin node (sometimes called the "Control Point of the origin Logical unit" or "CP(OLU)"), i.e., the branch network node (PAN), to the destination node (ENe). The first hop of this three-hop route is indicated in FIG. 3 as 2-NNC and includes the CV X'85' subfield supplied by the branch network node (PAN).

Finally, at Step 4, the branch network node (PAN) receives a Locate Found and an RSCV providing the selected route of 2-3-4. The branch network node (PAN) expands the RSCV to include the one hop between the origin node (ENa) and itself, and passes the expanded RSCV 1-2-3-4 to the origin node (ENa). The origin node (ENa) will use the corrected RSCV when it sends a BIND (or Route Setup request for the HPR case). Subsequent processing of the BIND request is not described because it conforms to standard APPN protocols.

Figure 4:
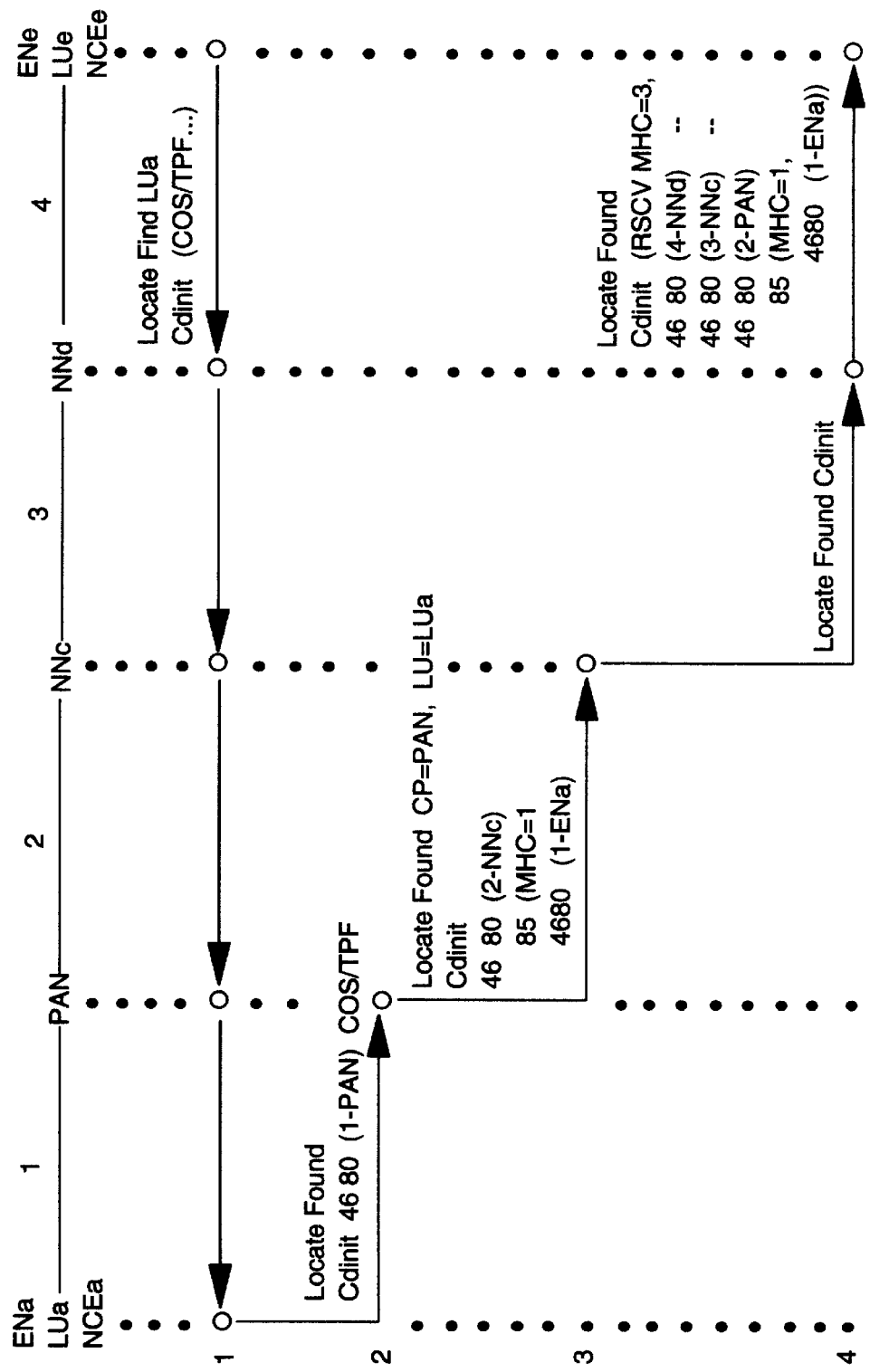
FIG. 4 is a control flow diagram illustrating the Locate Find and Locate Found operations according to the present invention where the origin node is not in a branch network and the destination node is in a branch network.

Referring to FIG. 4, a control flow diagram illustrating operations of the present invention during a Locate function in which the destination node (ENa) is in a branch network while the origin node (ENe) is not in a branch network will be described. In particular, the origin node (ENe) initiates a Locate Find request to locate the destination logical unit (LUa) at Step 1. The Locate Find request reaches the destination end node (ENa) by way of the branch network node (PAN). At Step 2, the destination node (ENa) receives the Locate Find request, replies positively providing a Locate Found reply, and sends the Locate Found and its own tail vector to the branch network node (PAN). At Step 3, the branch network node (PAN) substitutes its own tail vector for the tail vector of the destination node, and modifies the resource hierarchy indicating that the PAN is the control point for the destination logical unit (LUa). As a result, the standard network node (NNd) serving the origin node will make the branch network node (PAN) the destination of the third RSCV hop. The branch network node (PAN) includes the one-hop downlink route PAN-to-ENa in subfield X'85'. This one-hop route is calculated using the COS/TPF.

At Step 4, the same standard network node (NNd) calculates a three-hop route from the origin node (ENe) to the branch network node (PAN) but unknowingly forwards the hidden PAN-ENa route embedded in the branch network node's (PAN's) tail vector when it copies that tail vector into the RSCV. As such, the branch network node (PAN) will be able to correct the RSCV using the one-hop route embedded in the RSCV, when a BIND arrives. Alternatively, the origin node (ENe), if an RTP endpoint, can correct the RSCV using the embedded tail vector before initiating a Route Setup.

Figure 5:
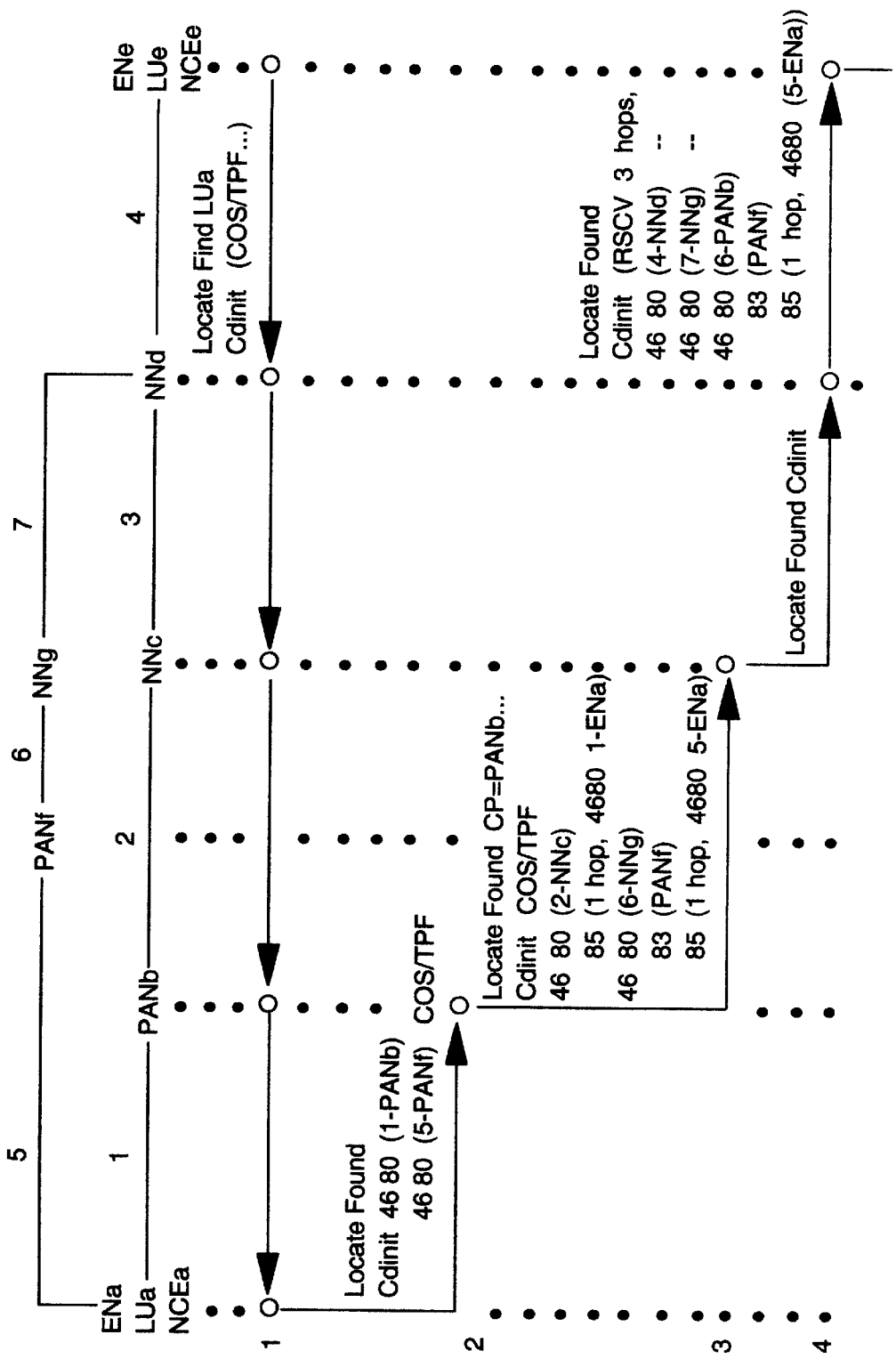
FIG. 5 is a block diagram illustrating the operations of Locate Find and Locate Found and the use of the tail vectors and the route selection control vector ("RSCV") according to the present invention the origin node is not in a branch network, and the destination node is in a branch network and is connected to two branch network nodes.

Referring to FIG. 5, a control flow diagram illustrating operations of the present invention during a Locate function when the destination node (ENa) is in a branch that is connected to the backbone via parallel branch network nodes will now be described. In particular, Steps 1 and 2 proceed in the same manner as Steps 1 and 2 of FIG. 4 except that the destination node (ENa) reports two tail vectors. The first branch network node (PANb) is the network node server for the destination node (ENa) and was configured with information about the second branch network node's (PANf's) tail vectors. At Step 3, the first branch network node (PANb) removes the tail vectors of the destination node (ENa) and replaces them with the tail vectors of both the first branch network node (PANb) and the second branch network node (PANf). Both sets of tail vectors appear to be associated with the serving branch network node, but vectors for other branch network nodes include a subfield X'83' to indicate the real branch network node. The branch network node (PANb) includes the route extension (i.e., one hop) to the destination node (ENa) in a subfield CV X'85' on each tail vector. At Step 4, the present invention operates in the same manner as it did with respect to Step 4 of FIG. 4. Processing of the BIND request will be described in reference to FIG. 8.

Figure 6:
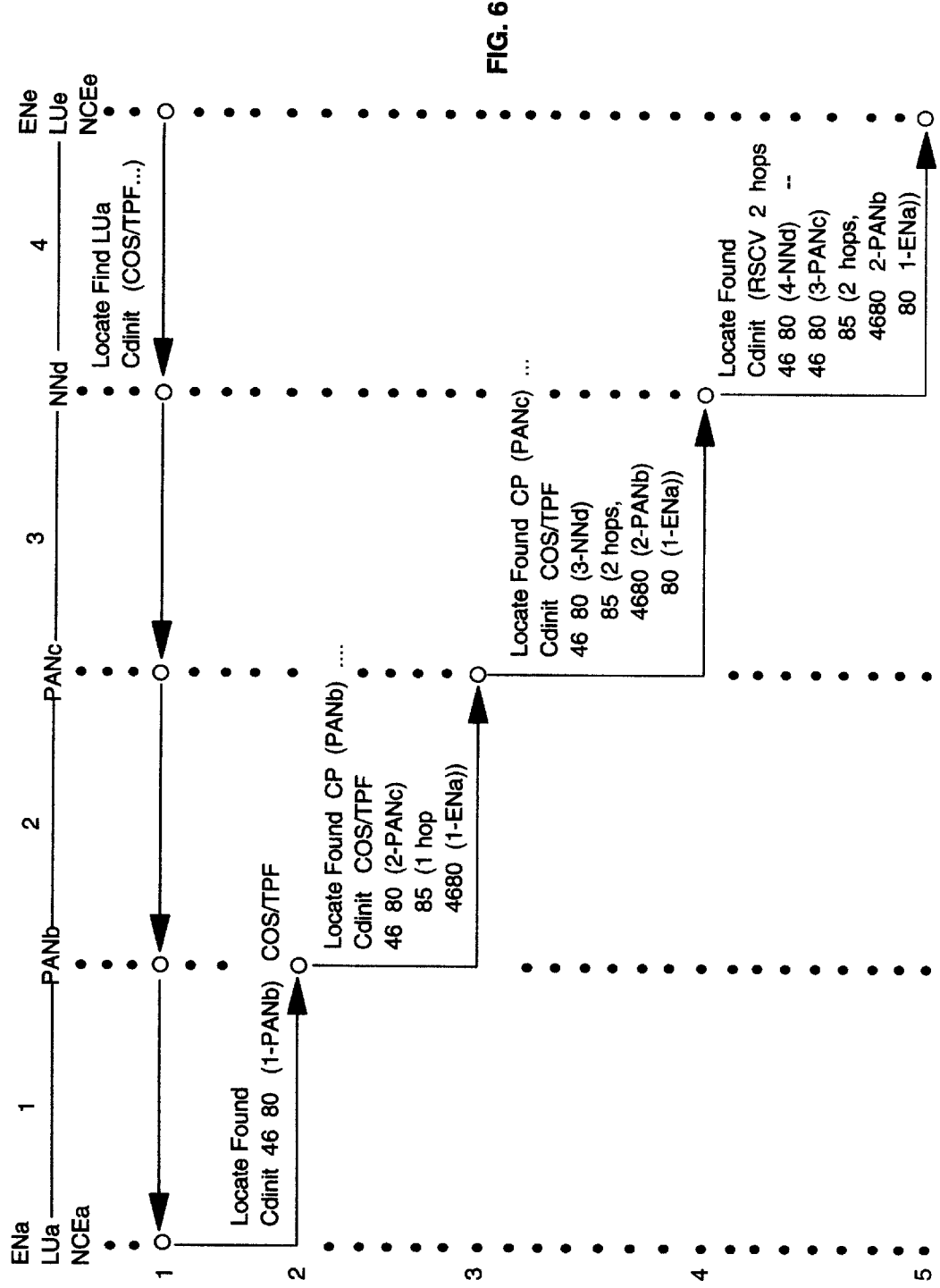
FIG. 6 is a control flow diagram illustrating the operations of Locate Find and Locate Found and management of the tail vectors and the RSCV according to the present invention where the origin node is not in a branch network and the destination node is in a cascaded branch network.

Referring to FIG. 6, a control flow diagram illustrating operations of the present invention during a Locate function for a destination node in a cascaded branch network will now be described. During operation of the Locate Find function, the present invention operates the same at Steps 1, 2 and 3 as it did with respect to Steps 1, 2 and 3 in FIG. 4. However, at Step 4, the second branch network node (PANC) replaces PANb's control point (CP) name in the resource hierarchy with its own control point (CP) name. In addition, the second branch network node (PANc) computes the one-hop route PANc-PANb to the apparent destination node which is really the first branch network node (PANb). The second branch network node (PANc) inserts the computed one-hop route in front of the hop in the existing subfield CV X'85' and increments the CV X'85' hop count. Thereafter, at Step 5, the standard network node serving the origin node (NNd) computes a two-hop route ENe-NNd-PANc to the apparent destination node (PANc). The origin end node (ENe) uses the incomplete RSCV to send a BIND request. Processing of the BIND request and the incomplete RSCV will be described with respect to FIG. 9.

Detailed Operation: BIND Operation for Non-high Performance Routine Flows

Figure 7:
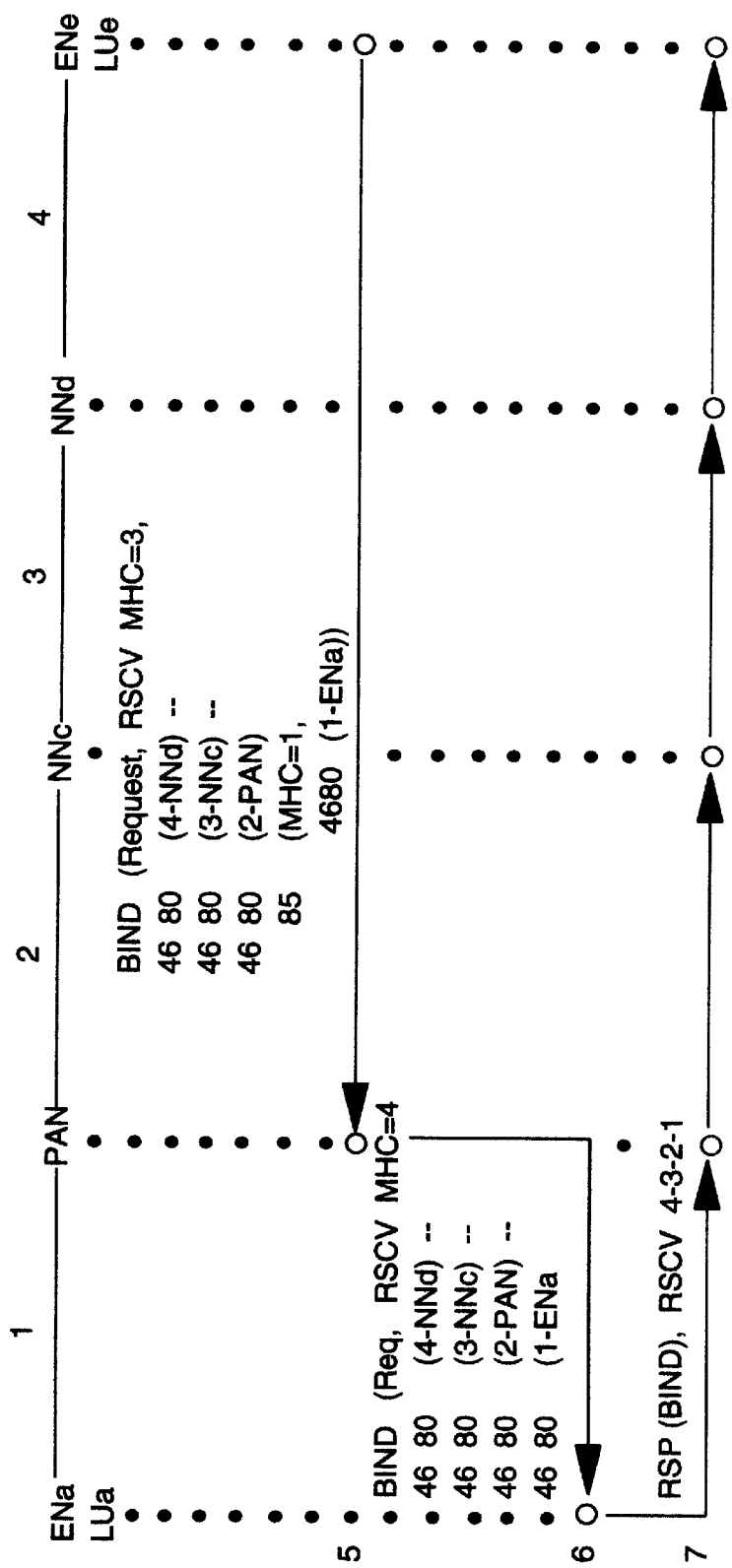
FIG. 7 is a control flow diagram illustrating the BIND operation according to the present invention for the network environment illustrated in FIG. 4 in which the origin node is not in a branch network and the destination node is in a branch network.
Figure 8:
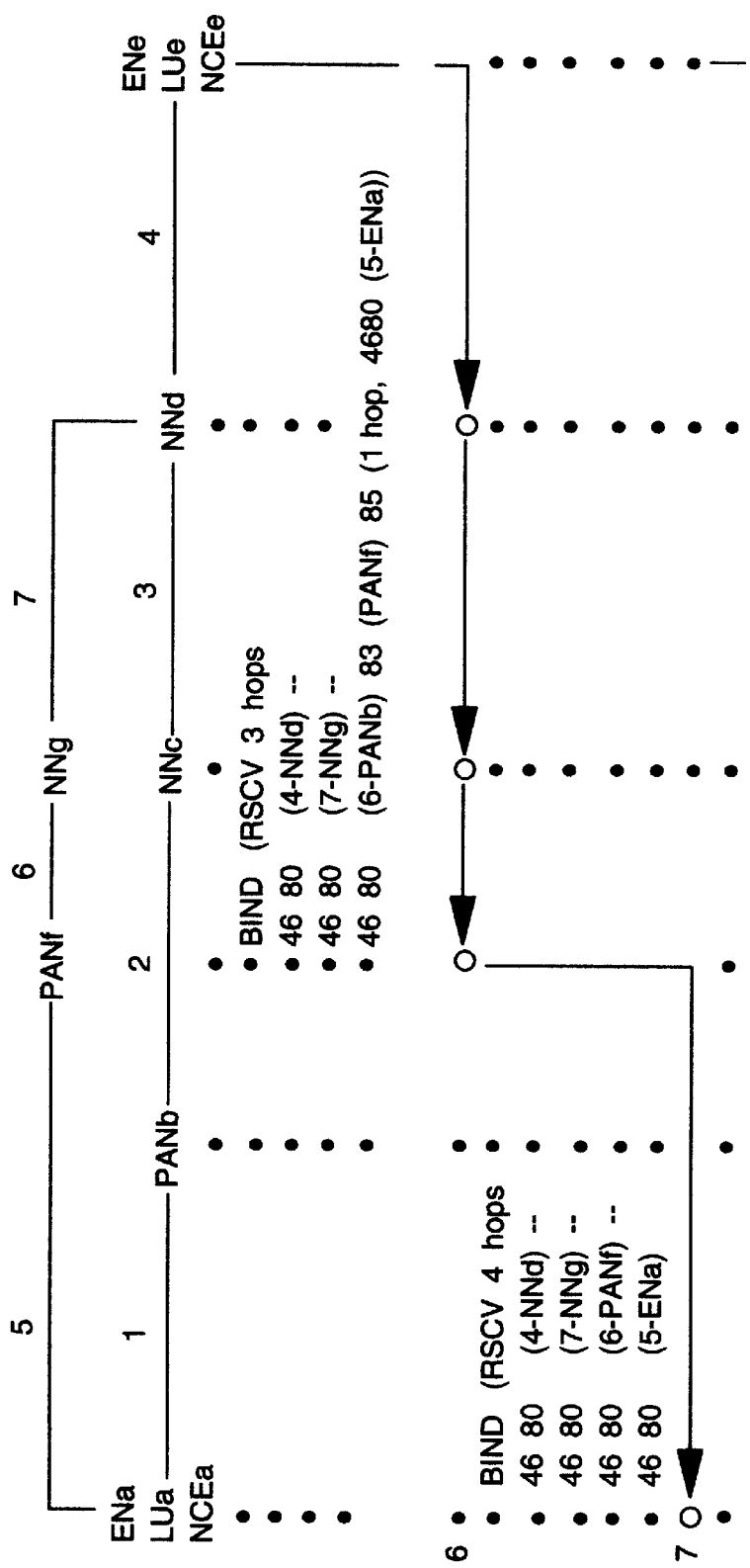
FIG. 8 is a control flow diagram illustrating the BIND operation according to the present invention for the network environment illustrated in FIG. 5 in which the origin node is not in a branch network and the destination node is in a branch network and is connected to two branch network nodes in parallel.
Figure 9:
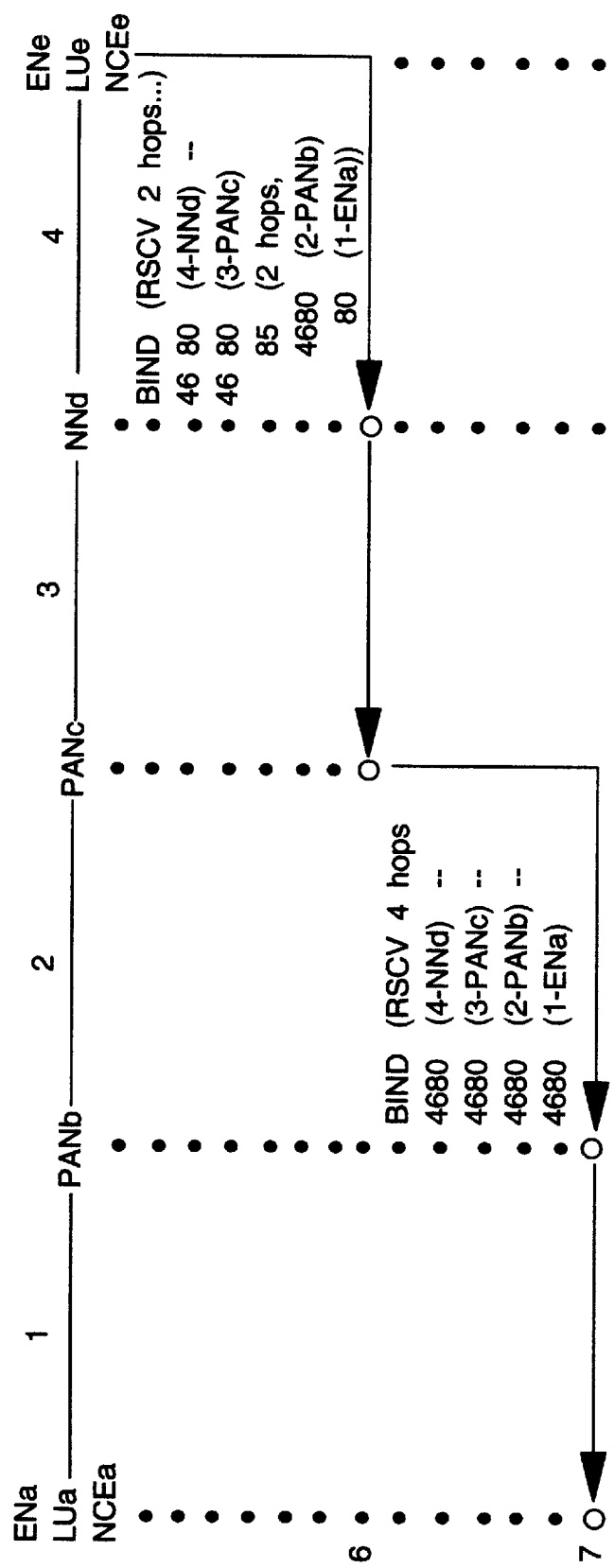
FIG. 9 is a control flow diagram illustrating the BIND operation according to the present invention in the network environment illustrated in FIG. 6 in which the origin node is not in a branch network and the destination node is in a cascaded branch network.
Figure 10:
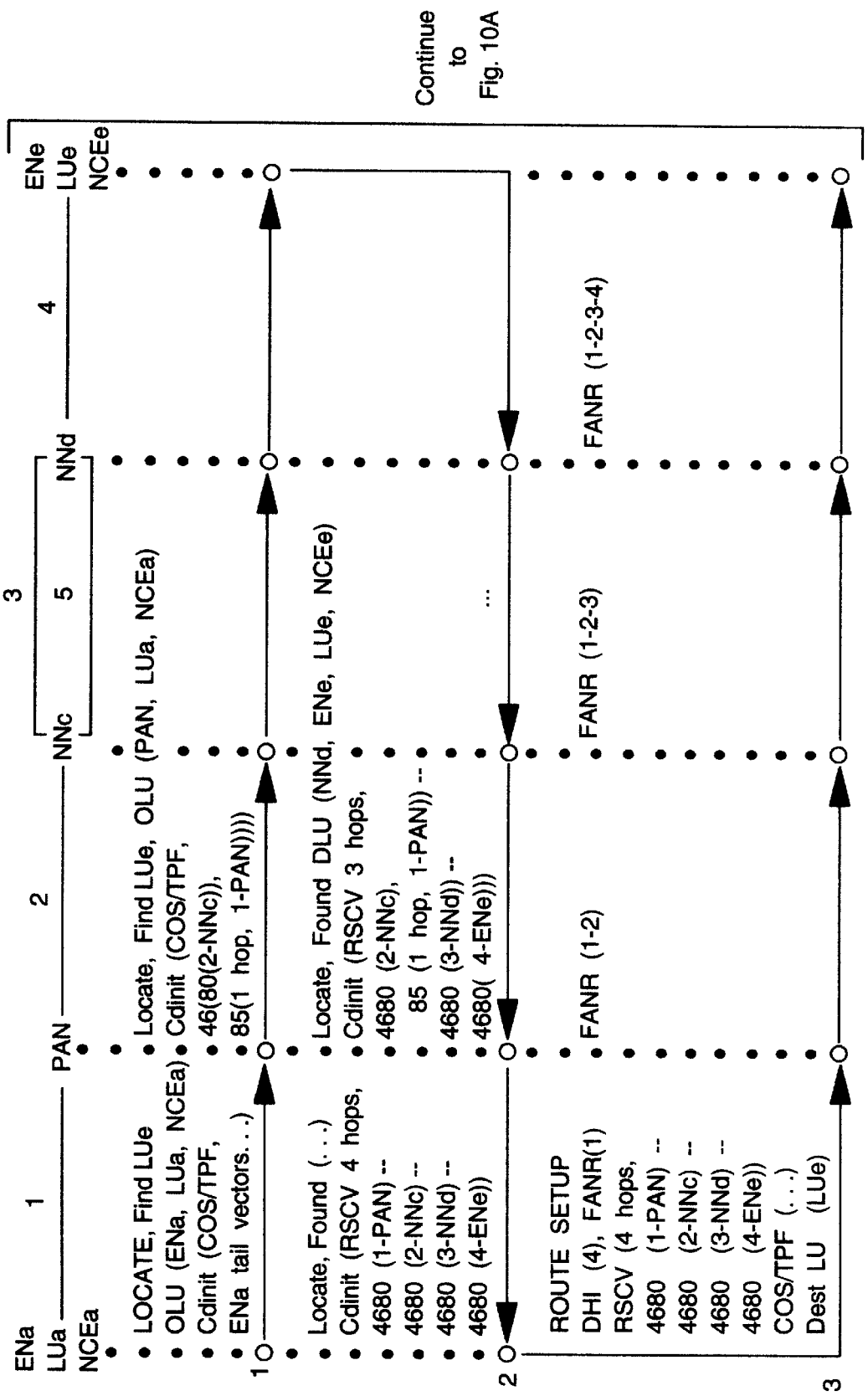
FIG. 10–10A is a control flow diagram illustrating the RTP Connection Setup operations according to the present invention in an environment in which the origin node is in a branch network and the destination node is not in a branch network.
Figure 10A:
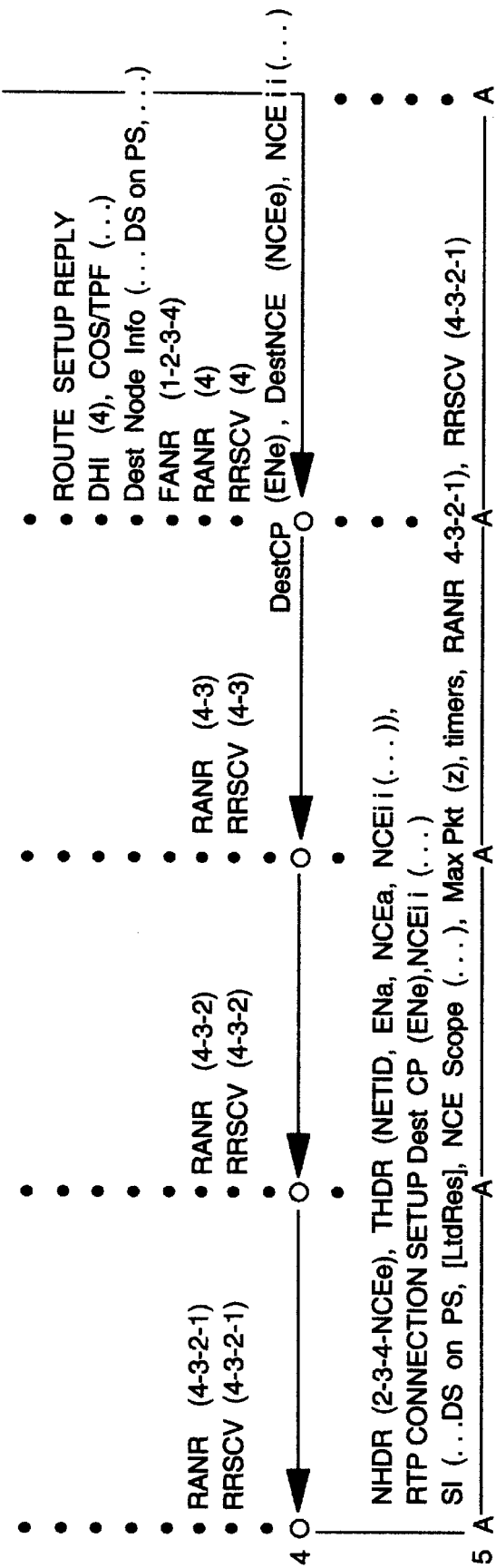

Referring to FIGS. 7–9, control flow diagrams illustrating operations of the present invention for BIND processing for non-HPR flows will now be described. FIG. 7 illustrates the processing of a BIND request from a node that is not in a branch network to an end node in a branch network. FIG. 7 is a continuation of the description of FIG. 4. At Step 5 of FIG. 7, the originating logical unit (LUe) sends a BIND request to the destination logical unit (LUa). However, the RSCV ends at the branch network node (PAN). At Step 6, the branch network node (PAN) expands the three-hop RSCV (4-3-2) using the subfield CV 4585 contained in the RSCV into a four-hop route (4-3-2-1). Thereafter, at Step 7, a standard BIND response carries the updated RSCV for management use at both session endpoint nodes.

Referring to FIG. 8, a control flow diagram illustrating operations of the present invention for BIND processing with parallel branch network nodes at the destination endpoint will be described. This BIND processing is a continuation of FIG. 5. At Step 6, the standard network node (NNg) uses the subfield CV X'83' to determine the node which will be the destination of the third hop. In this case, the second branch network node (PANf) is the destination of the third hop. Upon receipt of the RSCV at Step 7, the second branch network node (PANf) performs the PAN logic defined by this invention and expands the RSCV from three hops to four hops (4-7-6-5). Finally, a corrected RSCV is present when the BIND request arrives at the destination end node (ENa).

Referring to FIG. 9, a control flow diagram illustrating operations of the present invention for BIND processing in a branch network having cascaded branch network nodes will now be described. FIG. 9 is a continuation of the operations illustrated in FIG. 6 in which the route was selected. In particular, the second branch network node (PANc) receives the BIND with the two-hop RSCV from the standard network node (NNd) at Step 6. The two-hop RSCV contains an embedded subfield CV X'85'. Using this subfield, the second branch network node (PANc) expands the RSCV. As a result, when the first branch network node (PANb) receives the expanded RSCV from the second branch network node (PANc) at Step 7, it has a complete RSCV with four hops. The complete RSCV is then present when the BIND is transmitted on the downlink to the destination end node (ENa).

Detailed Operation: Branch Network Node Processing For HPR Flows

Referring now to FIGS. 10–14, operations of the present invention with respect to branch network node (PAN) processing for HPR flows will now be described. In particular, referring to FIG. 10, a control flow diagram illustrates the operations of the present invention for RTP connection setup for an origin node (ENa) in a branch network and a destination node (ENe) not in a branch network. In this example, the origin node (ENa) supports RTP. At Step 1, the originating logical unit (LUa) requests a session with a destination logical unit (LUe). As a result, the origin node (ENa) initiates a Locate request to what it believes to be its network node server, but in reality is a branch network node (PAN), along with the ANR routing label for the network connection endpoint (NCEa) associated with the originating logical unit (LUa). The branch network node (PAN) modifies the resource hierarchy and substitutes its own tail vector(s) as described in the descriptions of FIGS. 3–6. In addition, the branch network node (PAN) calculates a one-hop route ENa-PAN using the COS/TPF and appends the one-hop route to each of the branch network node's (PAN's) tail vectors in subfield CV X'85'. The branch network node (PAN) forwards the network connection endpoint (NCEa) unchanged. Finally, the branch network node (PAN) reports its own HPR capabilities in its tail vectors as will be described more particularly with reference to FIGS. 15A–15B.

At Step 2, using the modified tail vectors and the unchanged network connection endpoint (NCEa) received in Locate Find, the standard network node (NNc) computes a three-hop route 2-3-4 from the apparent origin node (CP (OLU)), which in reality is a branch network node (PAN), to the destination node (ENe). The first hop in the RSCV includes the subfield CV X'85' inserted by the branch network node (PAN). The branch network node (PAN) fixes the RSCV for the origin node (ENa), in the event that the origin node (ENa) is not HPR-capable or does not use HPR for this session. The direction of the one-hop between the origin node (ENa) and the branch network node (PAN) is correct. The Locate reply arrives at the origin node (ENa) containing the network connection endpoint (NCEe) associated with the destination logical unit (LUe).

At Step 3, the origin node (ENa) sends a Route Setup (RS) request using the RSCV. In addition, the destination hop index (DHI) shows the destination node (ENe) as the fourth hop of the RSCV and the destination logical unit (LU) as LUe. Finally, a forward automatic network routing (ANR) field for links 1-2-3-4 accumulates.

At Step 4, the destination node (ENe) sends a positive Route Setup (RS) reply. In addition, the destination node (ENe) returns the forward ANR (FANR). A reverse automatic network routing (ANR) vector and a reverse RSCV of 4-3-2-1 also accumulate. Finally, the destination node (ENe) supplies destination routing data (e.g., ENe, NCEe, NCEii( . . . ), COS) to the origin node (ENa). This destination routing data supplied by the destination node (ENe) is saved by the origin node (ENa) in case the communication path fails and a path switch is required.

At Step 5, the origin node (ENa) sends a Rapid Transport Protocol (RTP) connection setup to the destination endpoint (ENe). The RTP transport header (THDR) carries the origin node's (ENa's) origin routing data (e.g., ENa, NCEa, NCEii( . . . )). In addition, the destination node (ENe) saves the origin node's (ENa) routing data with the RTP connection for use in the event that the communication path fails, as the resulting path switch would require a search for the origin node (ENa). Finally, the origin node (ENa) returns the Reverse ANR (RANR) and Reverse RSCV (RRSCV) accumulated on the route setup (RS) reply. Processing of a path switch for this RTP connection continues at Steps 6a or 6b in FIGS. 12 or 13, respectively.

Figure 11A:
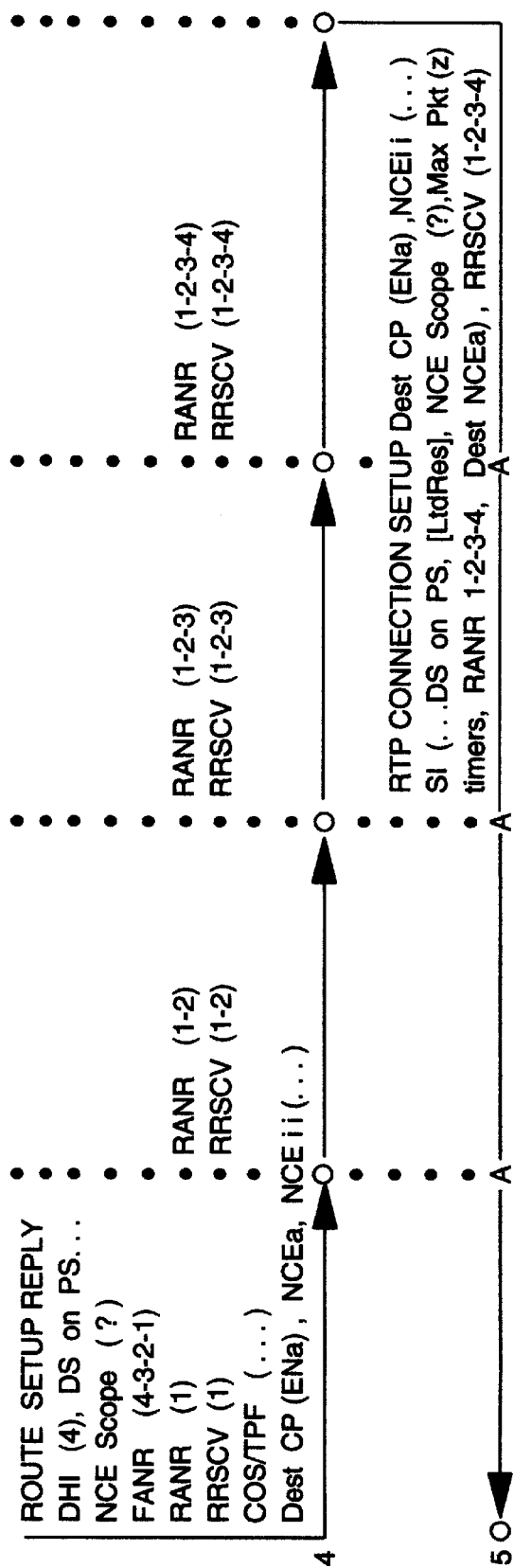

Referring to FIG. 11, a control flow diagram illustrating operations of the present invention during processing of RTP connection setup from an origin node not located in a branch network to a destination node that is located in a branch network will now be described. At Step 1, the origin node (ENe) initiates a Locate request to find a destination logical unit (LUa).

At Step 2, in response to the receipt of the Locate Find request, the destination node (ENa) replies positively that the destination logical unit (LUa) has been located and includes itself (ENa) in the hierarchy and supplies its tail vector(s). The destination branch network node (PAN) at the destination branch network implies that it owns the destination logical unit (LU) and substitutes its own tail vector(s) for the tail vector(s) of the destination end node (ENa). The branch network node (PAN) includes in the subfield X'85' a one-hop route PAN-ENa that the branch network node (PAN) calculated using the COS/TPF. Thereafter, the branch network node's (PAN's) network node server (NNc) inserts itself into the resource hierarchy. Subsequently, the standard network node (NNd) serving the origin node (ENe) calculates a three-hop route from the origin node (ENe) to the branch network node (PAN). However, the standard network node (NNd) unknowingly forwards to ENa the embedded information in the branch network node's (PAN's) tail vector.

At Step 3, the origin node (ENe) expands the RSCV representing the selected route in accordance with standard HPR protocols for an RTP endpoint by appending the subfield CV X'85' hop(s) to the RSCV and summing the maximum hop counts together. Thereafter, the origin node (ENe) sets the destination hop index (DHI) to 4 and the destination logical unit (LU) to LUa. In addition, the FANR vector accumulates the ANR labels for links 4-3-2-1. As a result of this processing, no special branch network node (PAN) processing is necessary.

At Step 4 of the example in FIG. 11, the destination end node (ENa) replies positively to the Route Setup (RS) request, and returns the FANR and its routing information (e.g., ENa, NCEa, . . . ) to the origin node (ENe). In addition, the RANR and RRSCV accumulate.

Finally, at Step 5, the origin node (ENe) receives the destination control point (CP) name (i.e., ENa) from the Route Setup (RS) reply and passes the usual information on the RTP connection setup. If the destination end node's (ENa's) NCE scope indicator equals one, the origin node (ENe) would have all the information needed to reuse this RTP connection for additional sessions. This information includes the RSCV, COS, and NCE data. Otherwise, the origin node (ENe) would have to search and compare the NCE before reusing the connection.

Figure 12A:
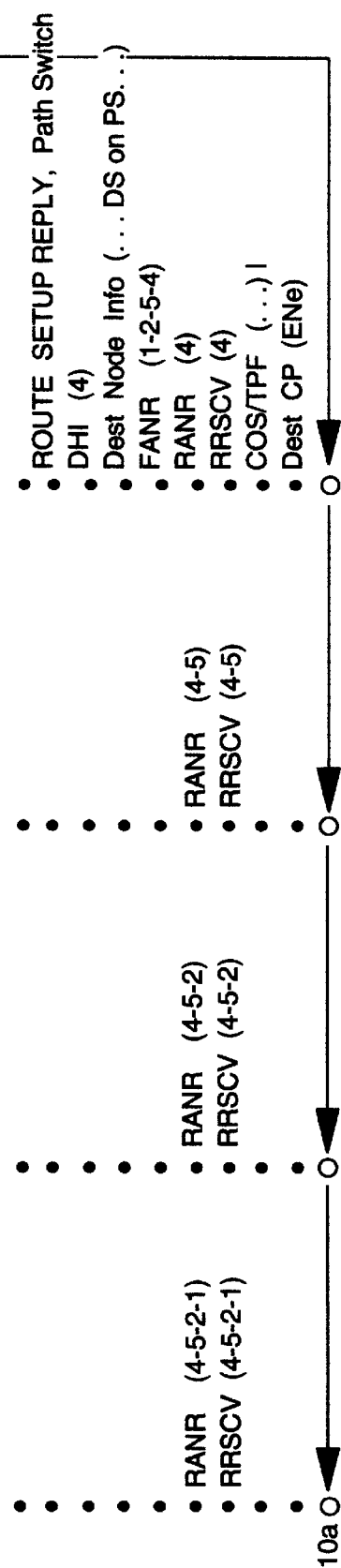

Referring to FIG. 12, a control flow diagram illustrating operations of the present invention for processing a path switch by a node located in a branch network some time after an RTP connection setup will now be described. The operations illustrated in FIG. 12 are a continuation of those operations described with respect to FIG. 10 and/or FIG. 11. The terms "origin" and "destination" are here used with respect to the procedure currently being performed. In the example illustrated in FIG. 12, assume that link 3 breaks at Step 6a. One endpoint, in this example, node (ENa), detects the failure of the RTP connection's route and initiates a path switch at Step 7a. Using the destination routing data supplied by the destination end node (ENe) (e.g., ENe, NCEe, NCEii( . . . ), COS), stored by the originating end node (ENa) at Step 4 of FIG. 10, or using origin routing information supplied by ENe in Steps 2–5 of FIG. 11, the originating end node (ENa) searches for the destination end node (ENe), rather than for the destination logical unit (LUe). As part of this search, the branch network node (PAN) for the origin node includes the subfield CV X'4685' from ENa to PAN in its tail vector(s).

Thereafter, the standard network node (NNc) serving the origin node (ENe) computes the route 2-5-4 at Step 8a to provide a route from the branch network node (PAN) to the destination node (ENe). The branch network node (PAN) then modifies the incomplete route to obtain a route of 1-2-5-4, and passes the modified route to the origin node (ENa).

At Step 9a, the origin node (ENa) sends a Route Setup-Path Switch (RS-PS) using the RSCV having a value of 1-2-5-4. The only destination routing information provided is the network connection endpoint (NCEe). In addition, the FANR vector accumulates ANR labels for links 1-2-5-4.

Finally, at Step 10a, the destination node (ENe) sends a positive Route Setup-Path Switch (RS-PS) reply. It also returns the FANR and its control point (CP) name to the origin node (ENa). In addition, the RANR and RRSCV vectors accumulate.

Figure 13:
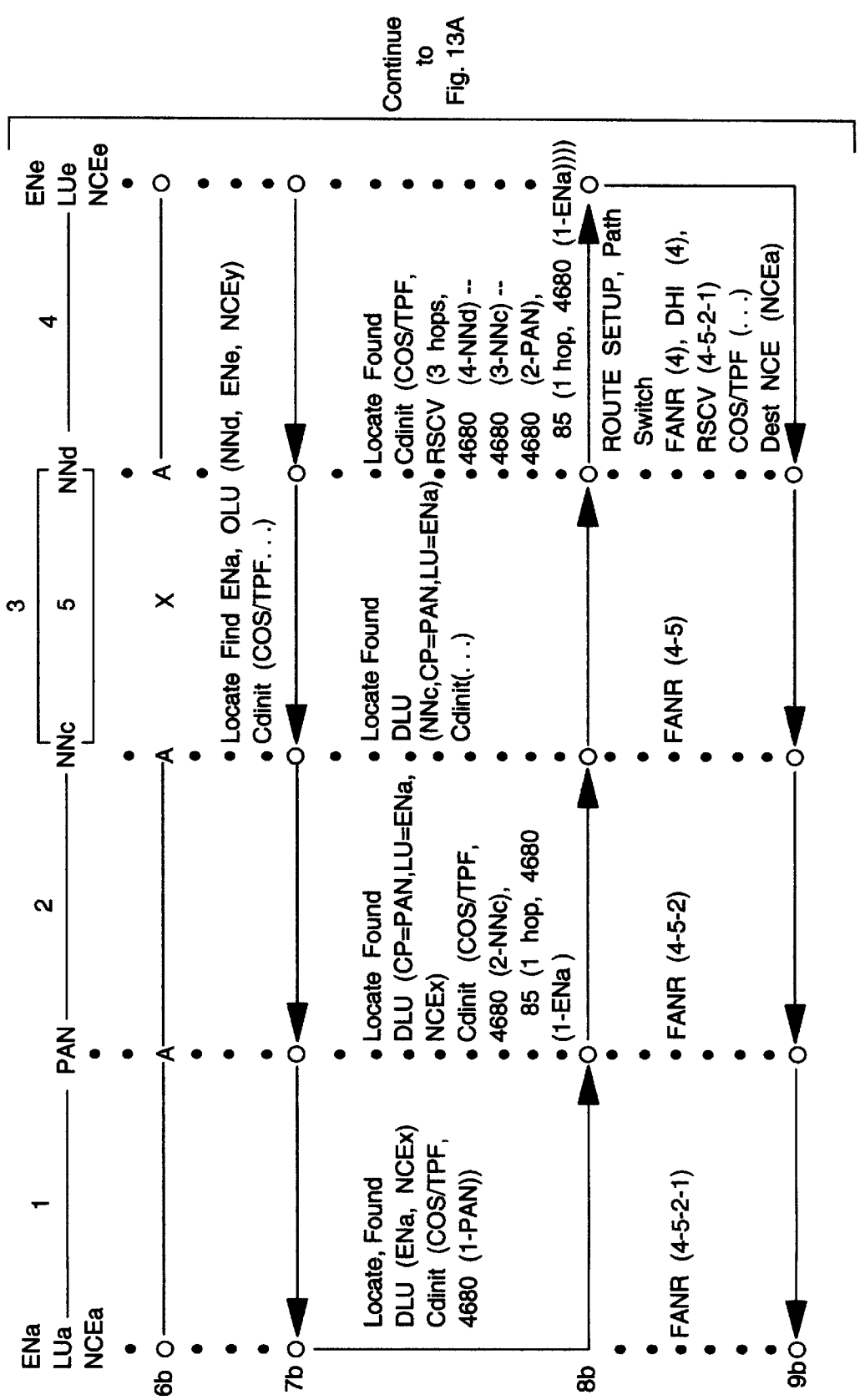

Referring now to FIG. 13, a control flow diagram illustrating operations of the present invention for processing a path switch initiated by a node that is not in a branch network, after an RTP connection setup involving one endpoint node in a branch network and one endpoint node not in a branch network, will now be described. FIG. 13 is a continuation of the connection setup described with respect to FIG. 10 and/or FIG. 11. At Step 6b of FIG. 13, a break in the communications path occurs at link 3. Thereafter, an RTP connection on this communication path times out and one endpoint node, in this case end node (ENe), initiates a path switch at Step 7b. The control blocks for the RTP connection point to the failed route and contain the control point information (e.g., CP, ENa, NCEa, NCEii( . . . ), COS/TPF) provided by the remote RTP endpoint's CP, and a search is initiated for the partner node (ENa).

At Step 8b, the branch network node (PAN) puts subfield CV X'4685' into its tail vectors during this search. In addition, the branch network node (PAN) downgrades the destination ENA's resource type to a logical unit (LU) and indicates that the branch network node (PAN) is the owning control point (CP). Thereafter, the search returns an RSCV having a value of 4-5-2 representing a route from the RTP endpoint in ENe to the branch network node (PAN) and a resource hierarchy (e.g., NNc, PAN, ENa).

At Step 9b, the origin node (ENe) expands the RSCV to 4-5-2-1 using the subfield CV X'4685' and sends a Route Setup-Path Switch (RS-PS). The destination network connection endpoint (NCE) is NCEa. Also at Step 9b, the FANR accumulates.

Finally, at Step 10b, the destination node (ENa) sends a positive Route Setup-Path Switch (RS-PS) reply to the origin node (ENe) including the FANR vector. In addition, the RANR and RRSCV vectors accumulate. Consequently, both RTP connection remember this route as a four-hop route, thereby permitting the RTP connection to be reused in the future.

Figure 14A:
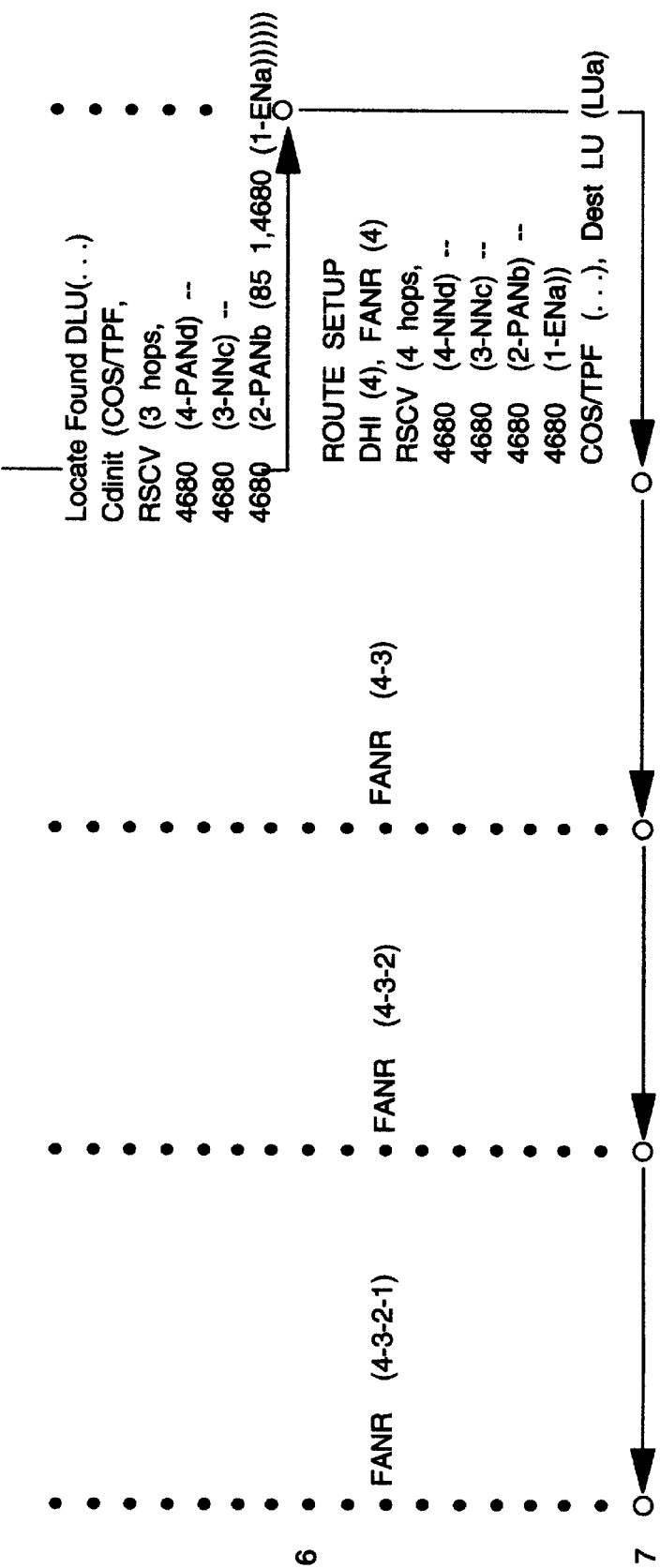

Referring to FIG. 14, a control flow diagram illustrating operations of the present invention for processing an RTP connection setup between two end nodes, both located in different branch networks, will now be described. The processing begins at Step 1 with the origin node (ENe) initiating a Locate request to find a destination logical unit (LUa). The origin node (ENe) includes tail vector 4 from ENe to PANd with its Locate request, which it sends to its branch network node (PANd) with an indication that the originating end node (ENe) is the owning control point (CP). Upon receipt of this information at Step 2, the branch network node (PANd) indicates that it is the origin control point (CP(OLU)) and substitutes its tail vectors 3 and 5 for the tail vector of the originating end node (ENe). In each tail vector, the branch network node (PANd) includes a one-hop route ENe-PANd in subfield X'85', which it calculated using the COS/TPF. Subsequently, the standard network node (NNc) serving the origin branch network node (PANd) inserts itself into the origin resource hierarchy. The branch network node (PANb) at the destination forwards the Locate request to the destination node (ENa).

At Step 3, the destination node (ENa) replies that LUa has been found, and sends its tail vector indicating that the link is 1 and an indication to the branch network node (PANb) that ENa owns the destination LU. Upon receiving this information at Step 4, the branch network node (PANb) indicates that it owns the destination logical unit, substitutes its tail vector for the tail vector of the destination end node, and embeds the one-hop route PANb-ENa, which it calculated using the COS/TPF, into its tail vector. The branch network node (PANb) transmits this information on link 2 to the standard network node (NNc) serving the destination node (PANb).

At Step 5, the standard network node (NNc) serving the origin node completes the destination resource hierarchy, and then using the originating logical unit (OLU) and the destination logical unit (DLU) tail vectors, it calculates a two-hop route to the destination branch network node (PANb) from the originating branch network node (PANd). Each of these hops contains an embedded one-hop route for the respective end node which each serves. At Step 6, the origin branch network node (PANd) fixes the RSCV using the subfield CV X'85' in the first hop. Thereafter, it passes the three-hop route to the origin end node (ENe) which still contains the embedded destination hop from the destination branch network node (PANb) to the destination end node (ENa). Upon receiving the three-hop route from the origin branch network node (PANd) at Step 7, the origin end node (ENe) parses the RSCV in accordance with standard HPR protocols for an RTP endpoint and expands the RSCV to four hops using the remaining subfield CV X'85'.

Finally, for High Performance Routing (HPR) flows, special processing by the branch network node (PAN) may be needed to correctly reflect the capabilities of nodes on the communications path. End nodes (ENs) report their own HPR capabilities on their tail vectors. A branch network node (PAN), acting in its end node (EN) role, reports its own HPR capabilities when it supplies tail vectors, e.g. as described previously with respect to FIG. 10 in Step 1. The HPR capabilities reflected in a RSCV are illustrated in FIG. 15A.

Figure 15A:
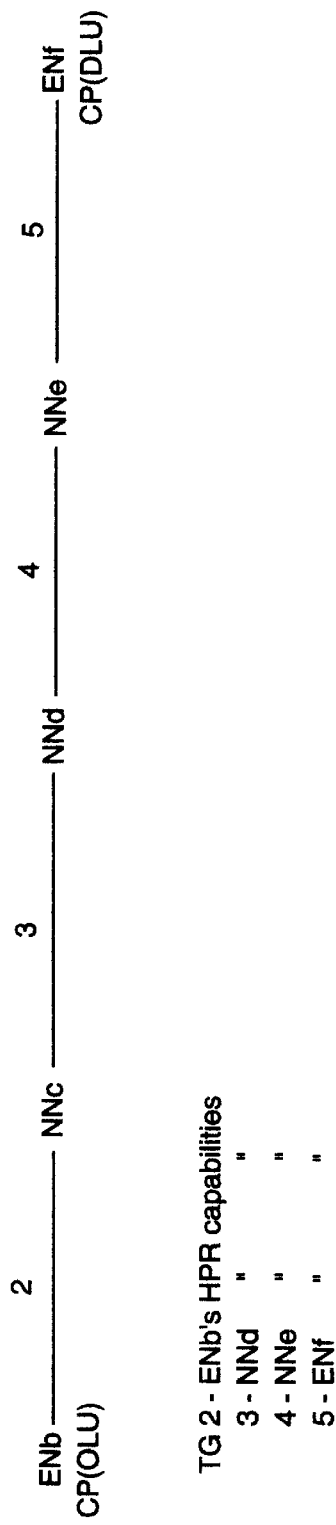
FIGS. 15A–B are route diagrams illustrating examples of routes established using special processing for HPR capabilities according to the present invention.
Figure 15B:
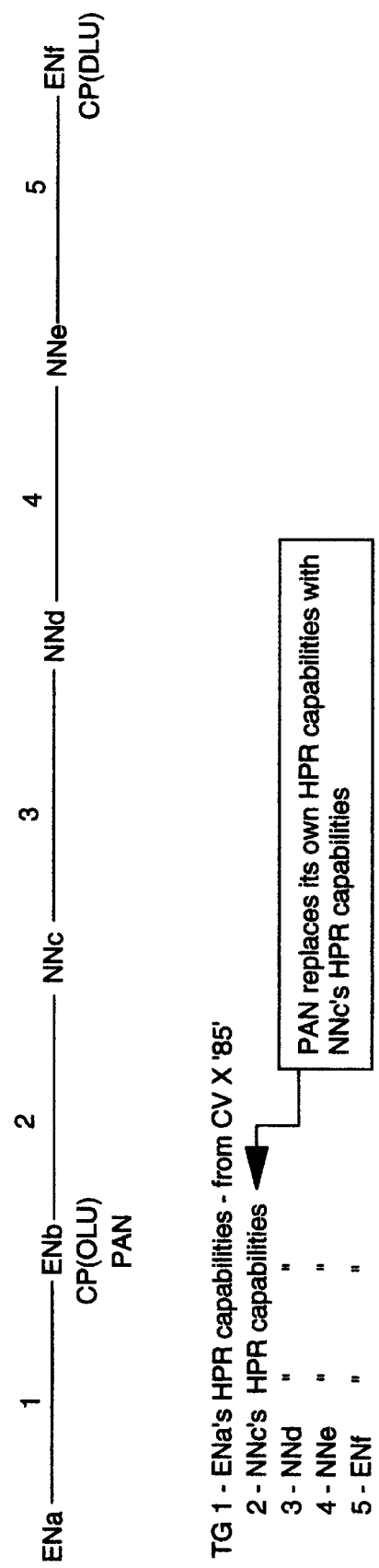

Referring to FIG. 15A, link 2 has the HPR capabilities of end node (ENb). Link 3 has the HPR capabilities of network node (NNd), link 4 has the HPR capabilities of network node (NNe), and link 5 has the HPR capabilities of end node (ENf). Notably, the RSCV does not reflect the HPR capabilities of the node after the origin node. Rather, the origin node obtains the HPR capabilities of that node, i.e., network node (NNc) in FIG. 15A, from local information such as an adjacent node control block. NNS(OLU) refers to the network node server of the originating logical unit.

The tail vector placed into the CV X'85' by a branch network node (PAN) needs to reflect correctly the HPR capabilities of served branch endpoint nodes. Consequently, a branch network node serving an end node in a branch that is an origin RTP endpoint needs to adjust the HPR capabilities in the RSCV when it processes the CV X'85' during Locate reply processing. In the example illustrated in FIG. 15B, the origin branch network node obtains the origin node's HPR capabilities from subfield CV X'85' in the first hop link 1 of the RSCV. The HPR capabilities in the second hop (link 2) of the FIG. 15B RSCV wrongly reflect the origin branch network node's capabilities. The origin branch network node replaces them with its own HPR capabilities. The remaining RSCV hops do not require correction. If the branch network nodes (PANs) are cascaded, each origin branch network node (PAN) performs this processing for the hop from itself to the next uplink node. As a result, the RSCV that reaches the real origin node correctly reflects the high performance routing (HPR) capabilities of each node on the route.

Detailed Operation: Branch Network Node
Processing for One Hop Routes

Figure 16:
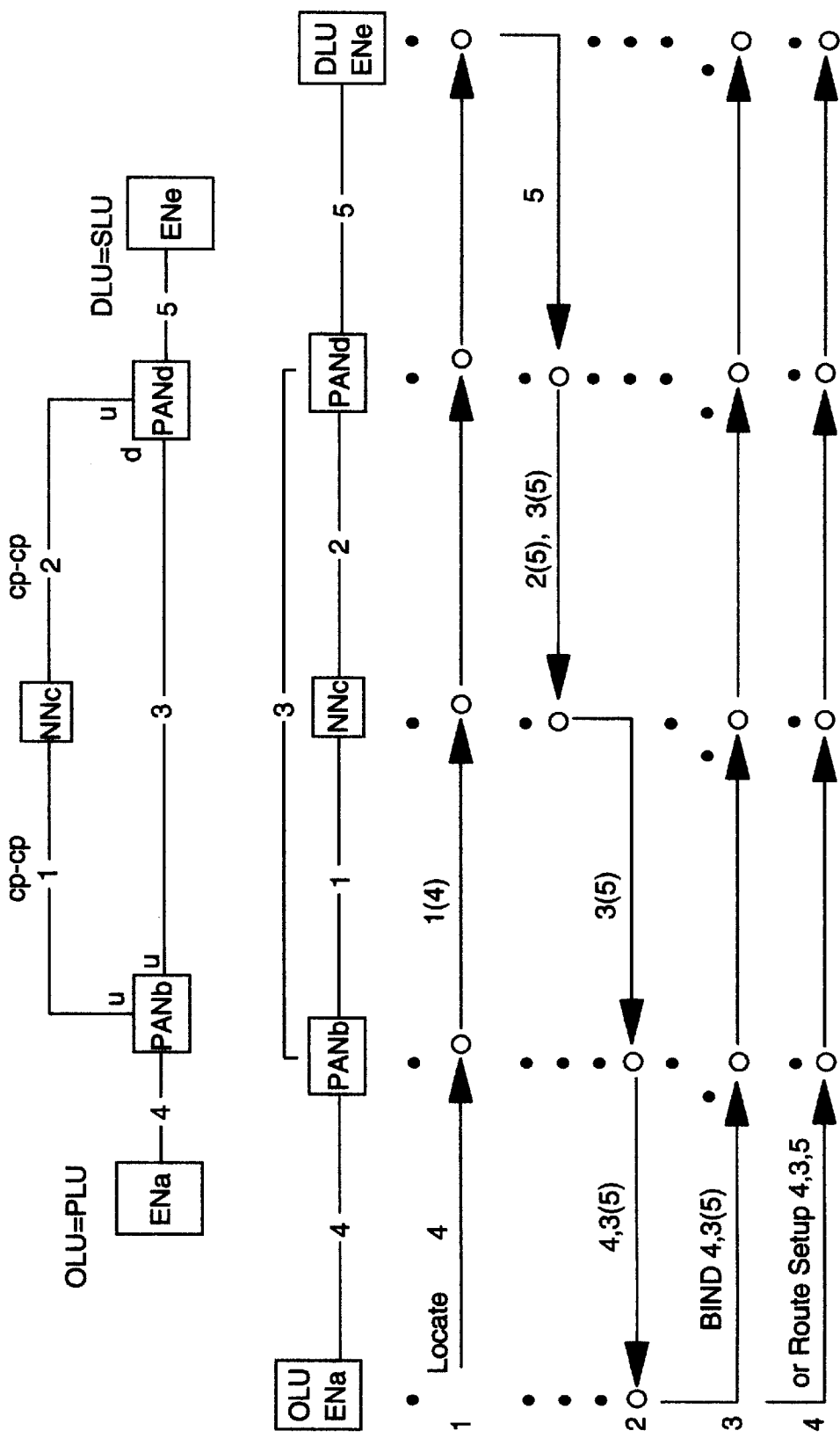
FIG. 16 is a control flow diagram illustrating the operations of the present invention for establishment of a route involving two branch networks with a link connecting their respective branch network nodes, when the hidden link in the RSCV may be incomplete or represent a different downlink.
Figure 17:
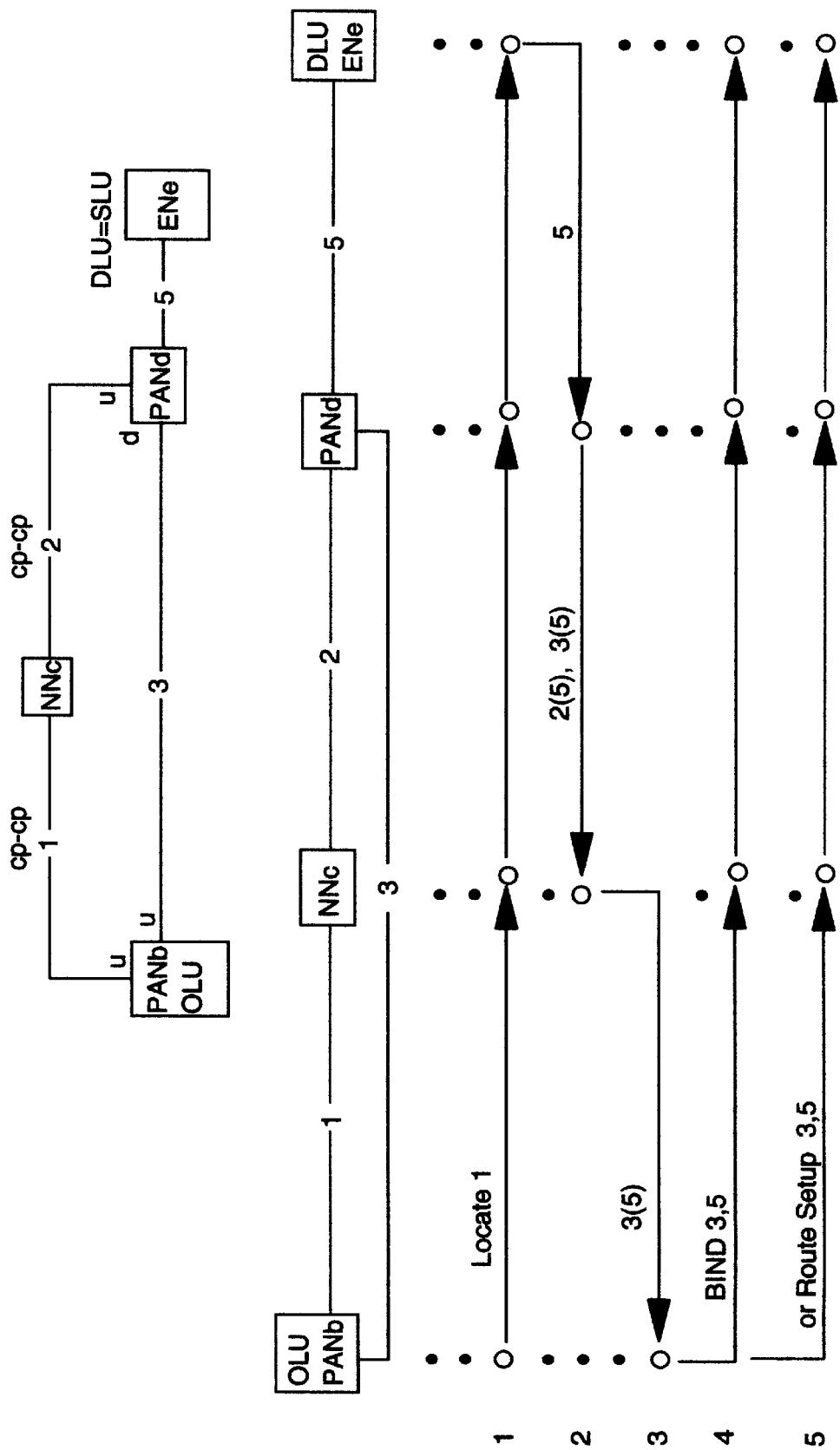
FIG. 17 is a control flow diagram illustrating the operations of the present invention for establishment of a route involving two branch networks with a link connecting their respective branch network nodes when a hidden link is present unexpectedly in the RSCV.
Figure 18:
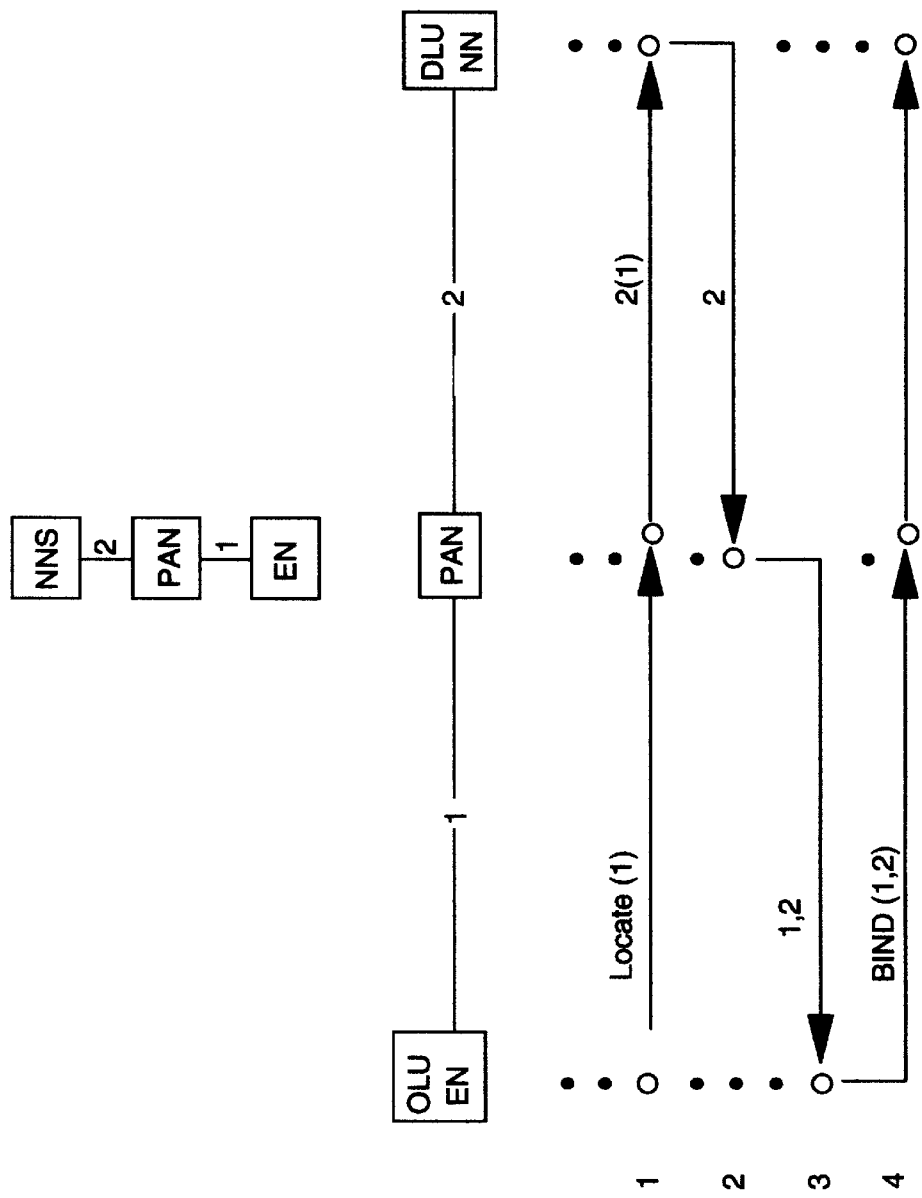
FIG. 18 is a control flow diagram illustrating the operations of the present invention for establishment of a route involving a single standard network node connected to one branch network node, when the origin node is in the branch network and the destination is the single standard network node, and a hidden link is missing from the RSCV.

Referring now to FIGS. 16–18, operations of the present invention with respect to branch network node processing in configurations where a direct one-hop path exists between two endpoints, at least one of which is in a branch network, will now be described. Unlike FIGS. 3–6 which illustrate the normal flows when the RSCV contains the correct routing information, including the hidden link(s), special cases exist where the RSCV will be incorrect and special steps are taken to correct it. There are three distinct special cases: the hidden link in the RSCV is incomplete or represents the other branch network node's downlink; a hidden link is present in the RSCV when none is expected; or the hidden link expected to be present in the RSCV is absent.

These special cases occur when there is a one-hop route between two branch network nodes, or when the destination logical unit is on the network node serving the destination branch network node, or the origin logical unit is on the network node serving the origin branch network node. Normally, hidden information inside the first RSCV hop is understood to represent a branch routing prefix, and hidden information inside the last RSCV hop is understood to represent a branch routing suffix. However, if the RSCV has just one hop, it is not possible to encode both a routing prefix and a suffix, so the meaning of the branch routing information is ambiguous. In each case, this invention defines how the branch network node handles the inconsistency and provides proper routing.

FIG. 16 is a control flow diagram illustrating the operations of the present invention for the establishment of a route involving an origin branch network node that is directly connected to a destination branch network node by one or more links. In this special case, the hidden link in the RSCV may either be incomplete, or represent an incorrect downlink. In the example illustrated in FIG. 16, the branch network nodes (PANb) and (PANd) use the standard network node (NNc) as their network node server. FIG. 16 only shows one network node, since one is the minimum number required to generate this special case; however, it should be understood that any number of network nodes could be present and each branch network node could have a different network node server.

According to APPN protocols, a standard origin node provides only tail vectors to network nodes and to connection networks (none to other end nodes). A standard destination node provides only tail vectors to network nodes, connection networks, and to the origin node. Thus the network node computing a route between two nodes that are directly attached to one another may have a choice of equivalent tail vector representations, one provided by the origin and the other provided by the destination. In the present invention, a branch routing prefix for the origin is hidden in the origin tail vector(s), and a branch routing suffix for the destination is hidden in the destination tail vector(s). When the network node computing the route chooses randomly between these two, it will necessarily discard either the origin or the destination's branch routing information. The special cases arise when the routing information needed by one endpoint in a branch network has been discarded in this manner.

To overcome this problem, this invention restricts the tail vectors provided by an origin branch network node as follows. An origin branch network node provides the same tail vectors that it would provide if it were a standard end node, except it that omits links to network nodes that are branch network nodes with which it does not have control-point-to-control-point (CP-CP) sessions. The omission of these particular links forces the network node computing the route to use the representation of the link provided by the destination node (which might be a branch network node), rather than the representation of that link provided by the origin node. The destination node's link representation might contain one or more CV X'85' vectors. If the origin branch routing information has been discarded, the origin branch network node can always replace it, but the origin BrNN has no way to obtain a branch routing suffix for a destination end node in the other branch network during Locate processing, other than from the RSCV on the Locate reply. So this omission ensures that the RSCV will contain that irreplaceable branch routing suffix, if any.

Referring again to FIG. 16, the origin branch network node (PANb) provides tail vector 1 containing the one-hop route 4 from end node (ENa) to itself encoded in a CV X'85' at Step 1. The origin branch network node (PANb) has two tail vectors of its own that it could report, links 1 and 3. Following the logic set forth above, it includes link 1, because that link goes to a network node that is not a branch network node, but it omits link 3 because that link goes to a network node that is a branch network node with which branch network node (PANb) does not have control-point-to-control-point (CP-CP) sessions.

At Step 2, on the Locate reply the destination branch network node (PANd) provides both of its tail vectors according to standard end node logic because it is emulating an end node (EN) on the uplink to NNc and must not confuse NNc. It provides link 2 because that link goes to a network node, and link 3 because that link goes to the apparent origin end node (PANb). When the standard network node selects the route, it might select the two-hop route 1-2, or the one-hop route consisting of link 3 only. In this example, the standard network node chooses the one-hop route link 3. Since the only representation of link 3 was provided by the destination branch network node (PANd) in Step 1, the branch routing information available to the origin branch network node (PANb) in the RSCV from the network node will be the route 3-5. The first hop 4 from the origin end node (ENa) to the origin branch network node (PANb) is not present as PANb would have expected. The CV X'85' for link 5 hidden in the link 3 information could be interpreted as a branch routing prefix or a suffix. Since the origin branch network node (PANb) realizes that it has no link 5 to an end node identified as ENe, it interprets the link 5 hidden information as a suffix. It once again computes a one-hop route from the origin end node (ENa) to itself (PANb) using the COS/TPF (as it did in Step 1) and uses that route as a prefix to complete the RSCV. The branch network node (PANb) then passes the partially-corrected RSCV 4-3, with link 5 suffix still hidden inside the link 3 information, to the origin end node (ENa). In Step 3, the origin end node (ENa) uses this RSCV to send a BIND. Alternatively, if it is an RTP endpoint in Step 4, the origin end node (ENa) completes the RSCV itself by decoding the link 5 hop, using standard HPR logic for RTP endpoints, and sends the Route Setup.

FIG. 17 illustrates a similar situation, except in this case the origin branch network node (PANb) itself originates a connection (no origin branch end node is involved). The origin branch network node (PANb) does not expect to see any concealed branch routing information in the RSCV, because no prefix is needed. However, in the FIG. 17 configuration, CV X'85' branch routing information is present as a suffix, because it pertains to the destination branch network, of which the origin branch network node is unaware.

At Step 1 of FIG. 17, the origin branch network node begins a Locate process similar to those described previously. As in Step 1 of FIG. 16, the origin branch network node (PANb) provides tail vector 1, since that link goes to a network node which is not a branch network node, and it omits link 3, since that link goes to a network node that is a branch network node with which it has no control-point-to-control-point (CP-CP) sessions. At Step 2 of FIG. 17, the destination branch network node (PANd) returns tail vectors 2 and 3, just as in FIG. 16. Also as in FIG. 16, the route chosen by the standard network node (NNe) will likely be the one-hop route (3) from the origin branch network node (PANb) to the destination branch network node (PANd). Since the origin branch network node (PANb) withheld its representation of link 3 at Step 1 of FIG. 17, the one-hop RSCV will contain only the hidden link 5 suffix provided by the destination branch network node (PANd). It will be understood by those having skill in the art that if branch networks are cascaded, the hidden information may represent a path traversing multiple links and that this in no way changes the logic described here. At Step 3, the origin branch network node (PANb) receives a Locate reply with this one-hop RSCV. It extends the RSCV and finds that a CV X'85' identifying link 5 to an end node ENe is unexpectedly present. At Step 4, as the connection origin, PANb need not supply any origin branch routing prefix. But it does complete the RSCV using the hidden information, which may be understood to be a route suffix, since it could not possibly be a prefix. The origin node (PANb) then sends either a BIND as shown at Step 4, or a Route Setup as shown at Step 5.

FIG. 18 illustrates a configuration where the destination logical unit (DLU) resides on the network node (NNS) serving the origin branch network node (PAN). At Step 1, the origin branch network node (PAN) provides tail vector 2, since that link goes to a network node that is not a branch network node. Inside vector 2 the origin branch network node (PAN) hides the one-hop route (1) from the origin end node (EN) to itself (PAN), as in FIG. 16. At Step 3 of FIG. 18, the network node server (NNS) may use either the representation of link 2 provided by the origin branch network node (PAN), or its own local representation of link 2. The choice as to which option to choose may be made randomly if both links have equal characteristics. However, if the network node (NNS) chooses its local representation of link 2, it will discard the link 1 branch routing prefix that the branch network node (PAN) expects to see. Inspecting the RSCV at Step 3, the branch network node (PAN) sees a one-hop route (2) originating at itself. However, the origin logical unit (EN) listed in the resource hierarchy does not match any of the logical units residing on the origin branch network node (PAN). In addition, the expected branch network routing prefix is not present. Determining that the origin control point (EN) resides in the branch served by the branch network node server (PAN), the branch network node (PAN) again computes a one-hop route from the origin end node (EN) to itself, using the COS/TPF, as it did previously at Step 1. Its corrects the RSCV using this one-hop route as a branch routing prefix. Finally, at Step 4, the end node (EN) has a correct, complete RSCV to use when sending its BIND or Route Setup.

In the drawings and specification, there have been disclosed typical preferred embodiments of the present invention and, although specific terms are employed, they are used in a generic and descriptive sense only and not for purposes of limitation, the scope of the invention being set forth in the following claims.

That which is claimed is:

1. A method for establishing a communications path having a plurality of nodes between an origin node and a destination node in a communications network, the communications network having a first branch network and a first backbone network, said first branch network operationally connectable to the first backbone network, the first backbone network having a network node, and only one of the origin node or the destination node being in the first branch network, wherein each node has tail vectors associated therewith, said method comprising the steps of:

establishing a route between the origin node and the destination node, said route calculated by the network node wherein said establishing step comprises the steps of:

selecting a route between the first branch network and the one of the origin node or the destination node not in the first branch network; and modifying said selected route to expand said selected route to the one of the origin node or the destination node in the first branch network, wherein a modified selected route between said origin node and said destination node is established; and wherein said modifying step comprises the steps of:

modifying tail vectors of the one of said origin node or said destination node in the first branch network to represent tail vectors of an intermediate node in said first branch network;

passing the modified tail vectors of the one of said origin node or said destination node in the first branch network to the network node;

receiving a selected route between the first branch network and the one of the origin node or the destination node not in the first branch network; and adding a link to the received selected route, said added link connecting the intermediate node in the first branch network and the one of said origin node or said destination node in the first branch network.

2. A method for establishing a communications path according to claim 1 wherein the origin node is in the first branch network; and wherein the network node is operationally connectable to an intermediate node in the first branch network and said intermediate node is operationally connectable to the origin node in the first branch network.

3. A method for establishing a communications path according to claim 1 wherein the destination node is in the first branch network; and wherein the network node is operationally connectable to an intermediate node in the first branch network and said intermediate node is operationally connectable to the destination node in the first branch network.

4. A method for establishing a communications path according to claim 1 wherein said origin node is in a first branch network and said destination node is in a second branch network.

5. A method for establishing a communications path according to claim 1 wherein said selecting step is preceded by the origin node locating the destination node.

6. A method for establishing a communications path according to claim 1 wherein said establishing step further comprises the step of connecting the origin node and the destination node along the modified selected route.

7. A method for establishing a communications path according to claim 6 wherein said connecting step is a BIND process.

8. A method for establishing a communication path according to claim 6 wherein said connecting step is a ROUTE SETUP process.

9. A method for establishing a communications path according to claim 1 wherein said establishing step is followed by the step of transferring data between said origin node and said destination node.

10. A method for establishing a communications path according to claim 1 wherein the origin node is in the first branch network; wherein the first branch network is operationally connectable to a second branch network and said second branch network is operationally connectable to the first backbone network; and wherein the network node is operationally connectable to an intermediate node in the second branch network and said intermediate node is operationally connectable to the origin node in the first branch network.

11. A method for establishing a communications path according to claim 1 wherein the destination node is in the first branch network; wherein the first branch network is operationally connectable to a second branch network and said second branch network is operationally connectable to the first backbone network; and wherein the network node is operationally connectable to an intermediate node in the second branch network and said intermediate node is operationally connectable to the destination node in the first branch network.

12. A method for establishing a communication path according to claim 1 wherein the origin node is in the first branch network; wherein the origin node is operationally connectable to a first intermediate node in the first branch network and the origin node is operationally connectable to a second intermediate node in the first branch network; and wherein the network node is operationally connectable to one of said first intermediate node or said second intermediate node.

13. A method for establishing a communications path according to claim 1 wherein the destination node is in the first branch network; wherein the destination node is operationally connectable to a first intermediate node in the first branch network and the destination node is operationally connectable to a second intermediate node in the first branch network; and wherein the network node is operationally connectable to one of said first intermediate node or said second intermediate node.

14. A method for establishing a communications path having a plurality of nodes between an origin node and a destination node in a communications network, the communications network having a first branch network and a first backbone network, said first branch network operationally connectable to the first backbone network, the first backbone network having a network node, and only one of the origin node or the destination node being in the first branch network, wherein each of said nodes has at least one tail vector associated therewith, said method comprising the steps of:

establishing a route between the origin node and the destination node, said route calculated by the network node; and wherein said establishing step comprises the steps of:

receiving a selected route from the network node, the selected route identifying a communications path between the first branch network and the one of the origin node and the destination node not in the first branch network;

modifying said selected route to expand said received selected route to the one of the origin node or the destination node in the first branch network, wherein a modified selected route between said origin node and said destination node is established; and transmitting the expanded selected route to the origin node; and wherein said receiving step is preceded by the steps of:

receiving a request at a branch network node in the first branch network from one of the origin node or the destination node in the first branch network to establish a communications path between the origin node and the destination node;

modifying the at least one tail vector associated with the one of the origin node or the destination node in the first branch network to include the at least one tail vector associated with the branch network node, such that the modified tail vector hides the knowledge of the link between the branch network node and the origin node or the destination node in the first branch network from the network node; and transmitting the request to establish a communications path between the origin node and the destination node, and the modified tail vector, to the network node.

15. A method for establishing a communications path according to claim 14 wherein the origin node is in the first branch network; and wherein the network node is operationally connectable to an intermediate node in the first branch network and said intermediate node is operationally connectable to the origin node in the first branch network.

16. A method for establishing a communications path according to claim 14 wherein the destination node is in the first branch network; and wherein the network node is operationally connectable to an intermediate node in the first branch network and said intermediate node is operationally connectable to the destination node in the first branch network.

17. A method for establishing a communications path according to claim 14 wherein said establishing step further comprises the step of connecting the origin node and the destination node along the modified selected route.

18. A method for establishing a communications path according to claim 17 wherein said connecting step is a BIND process.

19. A method for establishing a communications path according to claim 17 wherein said connecting step is a ROUTE SETUP process.

20. A method for establishing a communications path according to claim 14 wherein the origin node is on the first branch network; wherein the first branch network is operationally connectable to a second branch network and said second branch network is operationally connectable to the first backbone network; and wherein the network node is operationally connectable to an intermediate node in the second branch network and said intermediate node is operationally connectable to the origin node in the first branch network.

21. A method for establishing a communications path according to claim 14 wherein the destination node is in the first branch network; wherein the first branch network is operationally connectable to a second branch network and said second branch network is operationally connectable to the first backbone network; and wherein the network node is operationally connectable to an intermediate node in the second branch network and said intermediate node is operationally connectable to the destination node in the first branch network.

22. A method for establishing a communications path according to claim 14 wherein the origin node is in the first branch network; wherein the origin node is operationally connectable to a first intermediate node in the first branch network and the origin node is operationally connectable to a second intermediate node in the first branch network; and wherein the network node is operationally connectable to at least one of said first intermediate node and said second intermediate node.

23. A method for establishing a communications path according to claim 14 wherein the destination node is in the first branch network; wherein the destination node is operationally connectable to a first intermediate node in the first branch network and the destination node is operationally connectable to a second intermediate node in the first branch network; and wherein the network node is operationally connectable to at least one of said first intermediate node and said second intermediate node.

24. A system for establishing a communications path having a plurality of nodes between an origin node and a destination node in a communications network, the communications network having a first branch network and a first backbone network, said first branch network operationally connectable to the first backbone network, the first backbone network having a network node, and only one of the origin node or the destination node being in the first branch network, wherein each node has tail vectors associated therewith, said system comprising:

means for establishing a route between the origin node and the destination node, said route calculated by the network node wherein said means for establishing comprises:

means for selecting a route between the first branch network and the one of the origin node or the destination node not in the first branch network; and means for modifying said selected route to expand said selected route to the one of the origin node or the destination node in the first branch network, wherein a modified selected route between said origin node and said destination node is established; and wherein said means for modifying comprises:

means for modifying tail vectors of the one of said origin node or said destination node in the first branch network to represent tail vectors of an intermediate node in said first branch network;

means for passing the modified tail vectors of the one of said origin node or said destination node in the first branch network to the network node;

means for receiving a selected route between the first branch network and the one of the origin node or the destination node not in the first branch network; and means for adding a link to the received selected route, said added link connecting the intermediate node in the first branch network and the one of said origin node or said destination node in the first branch network.

25. A computer program product for establishing a communications path having a plurality of nodes between an origin node and a destination node in a communications network, the communications network having a first branch network and a first backbone network, said first branch network operationally connectable to the first backbone network, the first backbone network having network node, and only one of the origin node or the destination node being in the first branch network, wherein each node has tail vectors associated therewith, said computer program product comprising:

a computer readable storage medium having computer readable code means embodied in said medium, said computer readable code means comprising:

computer instruction means for establishing a route between the origin node and the destination node, said route calculated by the network node wherein said computer instruction means for establishing comprises:

computer instruction means for selecting a route between the first branch network and the one of the origin node or the destination node not in the first branch network; and computer instruction means for modifying said selected route to expand said selected route to the one of the origin node or the destination node in the first branch network, wherein a modified selected route between said origin node and said destination node is established; and wherein said computer instruction means for modifying comprises:

computer instruction means for modifying tail vectors of the one of said origin node or said destination node in the first branch network to represent tail vectors of an intermediate node in said first branch network;

computer instruction means for passing the modified tail vectors of the one of said origin node or said destination node in the first branch network to the network node;

computer instruction means for receiving a selected route between the first branch network and the one of the origin node or the destination node not in the first branch network; and computer instruction means for adding a link to the received selected route, said added link connecting the intermediate node in the first branch network and the one of said origin node or said destination node in the first branch network.

26. A method of providing a connection path in a node where a first endpoint of the connection path is in a branch network which is hidden from a second endpoint of the connection path, the method comprising:

receiving at a branch network node associated with the branch network a connection communication from one of the first or the second endpoint;

incorporating revised endpoint information in the received connection communication to provide branch network node information associated with a hop between the first endpoint and the branch network node so as to provide a modified communication containing information about the connection path within the branch network and outside the branch network; and forwarding the modified communication to a next node in the connection path.

27. A method according to claim 26, wherein connection communication is a locate find communication, wherein the first endpoint is an origin endpoint and the locate find communication is received by the branch network node from the origin endpoint node, and wherein the step of incorporating endpoint information comprises the step of replacing tail vectors in the locate find communication with tail vectors that reflect a one hop route from the origin node to the branch network node.

28. A method according to claim 26, wherein the connection communication is a resource control vector (RSVC) communication, wherein the first endpoint is an origin endpoint and wherein the step of incorporating comprises the step of inserting the one hop from the origin node to the branch network node as the first hop in the RSCV.

29. A method according to claim 26, wherein connection communication is a locate found communication, wherein the first endpoint is a destination endpoint and the locate found communication is received by the branch network node from the destination endpoint node, and wherein the step of incorporating endpoint information comprises the step of replacing tail vectors in the locate found communication with tail vectors that reflect a one hop route from the branch network node to the destination node.

30. A method according to claim 26, wherein the connection communication is a resource control vector (RSVC) communication, wherein the first endpoint is a destination endpoint and wherein the step of incorporating comprises the step of inserting the one hop from the branch network node to the destination network node as the last hop in the RSCV.

31. A system for providing a connection path in a node where a first endpoint of the connection path is in a branch network which is hidden from a second endpoint of the connection path, comprising:

means for receiving at a branch network node associated with the branch network a connection communication from one of the first or the second endpoint;

means for incorporating revised endpoint information in the received connection communication to provide branch network node information associated with a hop between the first endpoint and the branch network node so as to provide a modified communication containing information about the connection path within the branch network and outside the branch network; and means for forwarding the modified communication to a next node in the connection path.

32. A system according to claim 31, wherein connection communication is a locate find communication, wherein the first endpoint is an origin endpoint and the locate find communication is received by the branch network node from the origin endpoint node, and wherein the means for incorporating endpoint information comprises means for replacing tail vectors in the locate find communication with tail vectors that reflect a one hop route from the origin node to the branch network node.

33. A system according to claim 31, wherein the connection communication is a resource control vector (RSVC) communication, wherein the first endpoint is an origin endpoint and wherein the means for incorporating comprises means for inserting the one hop from the origin node to the branch network node as the first hop in the RSCV.

34. A system according to claim 31, wherein connection communication is a locate found communication, wherein the first endpoint is a destination endpoint and the locate found communication is received by the branch network node from the destination endpoint node, and wherein the means for incorporating endpoint information comprises means for replacing tail vectors in the locate found communication with tail vectors that reflect a one hop route from the branch network node to the destination node.

35. A system according to claim 31, wherein the connection communication is a resource control vector (RSVC) communication, wherein the first endpoint is a destination endpoint and wherein the means for incorporating comprises means for inserting the one hop from the branch network node to the destination network node as the last hop in the RSCV.

36. A computer program product for providing a connection path in a node where a first endpoint of the connection path is in a branch network which is hidden from a second endpoint of the connection path, comprising:

a computer readable storage medium having computer readable program code means embodied in said medium, said computer readable program code means comprising:

computer readable program code means for receiving at a branch network node associated with the branch network a connection communication from one of the first or the second endpoint;

computer readable program code means for incorporating revised endpoint information in the received connection communication to provide branch network node information associated with a hop between the first endpoint and the branch network node so as to provide a modified communication containing information about the connection path within the branch network and outside the branch network; and computer readable program code means for forwarding the modified communication to a next node in the connection path.

37. A computer program product according to claim 36, wherein connection communication is a locate find communication, wherein the first endpoint is an origin endpoint and the locate find communication is received by the branch network node from the origin endpoint node, and wherein the computer readable program code means for incorporating endpoint information comprises computer readable program code means for replacing tail vectors in the locate find communication with tail vectors that reflect a one hop route from the origin node to the branch network node.

38. A computer program product according to claim 36, wherein the connection communication is a resource control vector (RSVC) communication, wherein the first endpoint is an origin endpoint and wherein the computer readable program code means for incorporating comprises computer readable program code means for inserting the one hop from the origin node to the branch network node as the first hop in the RSCV.

39. A computer program product according to claim 36, wherein connection communication is a locate found communication, wherein the first endpoint is a destination endpoint and the locate found communication is received by the branch network node from the destination endpoint node, and wherein the computer readable program code means for incorporating endpoint information comprises computer readable program code means for replacing tail vectors in the locate found communication with tail vectors that reflect a one hop route from the branch network node to the destination node.

40. A computer program product according to claim 36, wherein the connection communication is a resource control vector (RSVC) communication, wherein the first endpoint is a destination endpoint and wherein the computer readable program code means for incorporating comprises computer readable program code means for inserting the one hop from the branch network node to the destination network node as the last hop in the RSCV.

* * * * *

UNITED STATES PATENT AND TRADEMARK OFFICE
CERTIFICATE OF CORRECTION

PATENT NO. : 6,097,727
DATED : August 1, 2000
INVENTOR(S) : Marcia Lambert Peters Page 1 of 1

It is certified that error appears in the above-identified patent and that said Letters Patent is hereby corrected as shown below:

<u>Column 26,</u>
Line 14 should read:
-- network, the first backbone network having a network node, --

Signed and Sealed this

Seventh Day of May, 2002

*Attest:*

*Attesting Officer*

JAMES E. ROGAN
*Director of the United States Patent and Trademark Office*